US012631568B2

(12) United States Patent
Zeng et al.

(10) Patent No.: US 12,631,568 B2
(45) Date of Patent: May 19, 2026

(54) CARTRIDGES AND USES THEREOF

(71) Applicant: Instrumentation Laboratory Company, Bedford, MA (US)

(72) Inventors: Hansong Zeng, Acton, MA (US); Olubode Ogunlusi, Framingham, MA (US); Krystal Labarge, Lunenburg, MA (US); Victor Sarpong, Lawrence, MA (US); Josef Kerimo, Concord, MA (US); Gert Blankenstein, Munich (DE); Benjamin Horev, Littleton, MA (US); Gustavo Oliveira, Solana Beach, CA (US)

(73) Assignee: Instrumentation Laboratory Company, Bedford, MA (US)

( * ) Notice: Subject to any disclaimer, the term of this patent is extended or adjusted under 35 U.S.C. 154(b) by 183 days.

(21) Appl. No.: 18/196,220

(22) Filed: May 11, 2023

(65) Prior Publication Data

US 2024/0377337 A1     Nov. 14, 2024

(51) Int. Cl.
*G01N 21/93* (2006.01)
*B01L 3/00* (2006.01)
(52) U.S. Cl.
CPC .............. *G01N 21/93* (2013.01); *B01L 3/502* (2013.01); *G01N 2201/1273* (2013.01)
(58) Field of Classification Search
CPC ............ G01N 21/93; G01N 2201/1273; B01L 3/502; B01L 2200/0621; B01L 2200/0689;

(Continued)

(56) References Cited

U.S. PATENT DOCUMENTS

| 7,607,641 B1 | 10/2009 | Yuan |
| 8,323,573 B2 | 12/2012 | Gao |

(Continued)

FOREIGN PATENT DOCUMENTS

| CN | 112195094 A | 1/2021 |
| EP | 2143491 A1 | 1/2010 |

(Continued)

OTHER PUBLICATIONS

Tomaras (Serpentine Micromixers Using Extensional Mixing Elements). Micromachines 2022, 13(10), 1785; https://doi.org/10.3390/mi13101785 Published: Oct. 20, 2022 (Year: 2022).*

(Continued)

*Primary Examiner* — Jennifer Wecker
*Assistant Examiner* — Jonathan Bortoli
(74) *Attorney, Agent, or Firm* — ARENTFOX SCHIFF LLP

(57)     ABSTRACT

An example cartridge includes a base having a channel configured to receive fluid, where the fluid includes a test sample to be tested on the cartridge, and a structure including at least part of a fluidic duct. The structure is configured to move relative to the base between a first position and a second position. In the first position, the channel and fluidic duct are aligned to create a fluidic connection between the channel and the fluidic duct and, in the second position, the channel and the fluidic duct are unaligned to block a fluidic connection between the channel and the fluidic duct.

19 Claims, 26 Drawing Sheets

(58) Field of Classification Search
CPC ......... B01L 2200/16; B01L 2300/0681; B01L
2300/0816; B01L 2300/0883; B01L
2400/0487; B01L 2400/049; B01L
2400/065; B01L 2400/0655; B01L
3/502738
See application file for complete search history.

(56) References Cited

U.S. PATENT DOCUMENTS

| | | | |
|---|---|---|---|
| 8,384,374 | B2 | 2/2013 | Gao |
| 8,580,209 | B2 | 11/2013 | Kurowski et al. |
| 9,012,236 | B2 | 4/2015 | Jovanovich et al. |
| 9,151,701 | B2 | 10/2015 | Zhou et al. |
| 9,777,317 | B2 | 10/2017 | Spoto et al. |
| 9,808,802 | B2 | 11/2017 | Dothie et al. |
| 9,938,571 | B2 | 4/2018 | Battrell et al. |
| 10,065,185 | B2 | 9/2018 | Handique |
| 10,065,188 | B2 | 9/2018 | Johnson et al. |
| 10,144,009 | B2 | 12/2018 | Bhagat et al. |
| 10,427,155 | B2 | 10/2019 | Aravanis et al. |
| 10,557,132 | B2 | 2/2020 | Williams et al. |
| 10,604,788 | B2 | 3/2020 | Wu et al. |
| 10,632,464 | B2 | 4/2020 | Schenk et al. |
| 10,751,719 | B2 | 8/2020 | Arlett et al. |
| 10,767,219 | B2 | 9/2020 | Sabounchi et al. |
| 10,843,193 | B2 | 11/2020 | Engel et al. |
| 10,898,896 | B2 | 1/2021 | Zenhausern et al. |
| 2005/0169778 | A1 | 8/2005 | Blankenstein et al. |
| 2011/0194977 | A1 | 8/2011 | Miyamura et al. |
| 2013/0206253 | A1 | 8/2013 | Kurowski et al. |
| 2017/0050185 | A1* | 2/2017 | Boehm ............. B01L 3/502715 |
| 2017/0241977 | A1 | 8/2017 | Wilson et al. |
| 2018/0015475 | A1 | 1/2018 | Arlett et al. |
| 2018/0214870 | A1 | 8/2018 | Reddy et al. |
| 2018/0272340 | A1 | 9/2018 | Govyadinov et al. |
| 2018/0353957 | A1 | 12/2018 | Bishop et al. |
| 2019/0201905 | A1* | 7/2019 | Bianchessi ........ B01L 3/502715 |
| 2019/0204260 | A1 | 7/2019 | Uludag et al. |
| 2020/0047183 | A1 | 2/2020 | Blankenstein et al. |
| 2020/0269241 | A1 | 8/2020 | Joris et al. |

FOREIGN PATENT DOCUMENTS

| | | | |
|---|---|---|---|
| EP | 3495811 | A1 | 6/2019 |
| WO | 2016117725 | A1 | 7/2016 |

OTHER PUBLICATIONS

Invitation to Pay Additional Fees and Partial International Search Report for related International Application No. PCT/US2024/024005, mailed Jul. 17, 2024 (12 pgs.).

International Search Report and Written Opinion received for PCT Patent Application No. PCT/US2024/024005, mailed on Sep. 11, 2024, 22 pages.

International Preliminary Report on Patentability received for PCT Patent Application No. PCT/US2024/024005, mailed on Nov. 20, 2025, 14 pages.

Notice of Allowance received for Chinese Patent Application No. 202421034301.1, mailed on Apr. 21, 2025, 2 pages of Original Copy only.

* cited by examiner

| FIG. 1A |
| FIG. 1B |
| FIG. 1 |

| FIG. 2A |
|---|
| FIG. 2B |
| FIG. 2 |

| FIG. 3A |
|---------|
| FIG. 3B |
| FIG. 3 |

| FIG. 4A |
| FIG. 4B |
| FIG. 4 |

| FIG. 5A |
| FIG. 5B |
| FIG. 5C |
| FIG. 5 |

| FIG. 6A |
|---------|
| FIG. 6B |
| FIG. 6 |

| FIG. 7A |
| FIG. 7B |
| FIG. 7 |

| FIG. 10A |
| FIG. 10B |
| FIG. 10 |

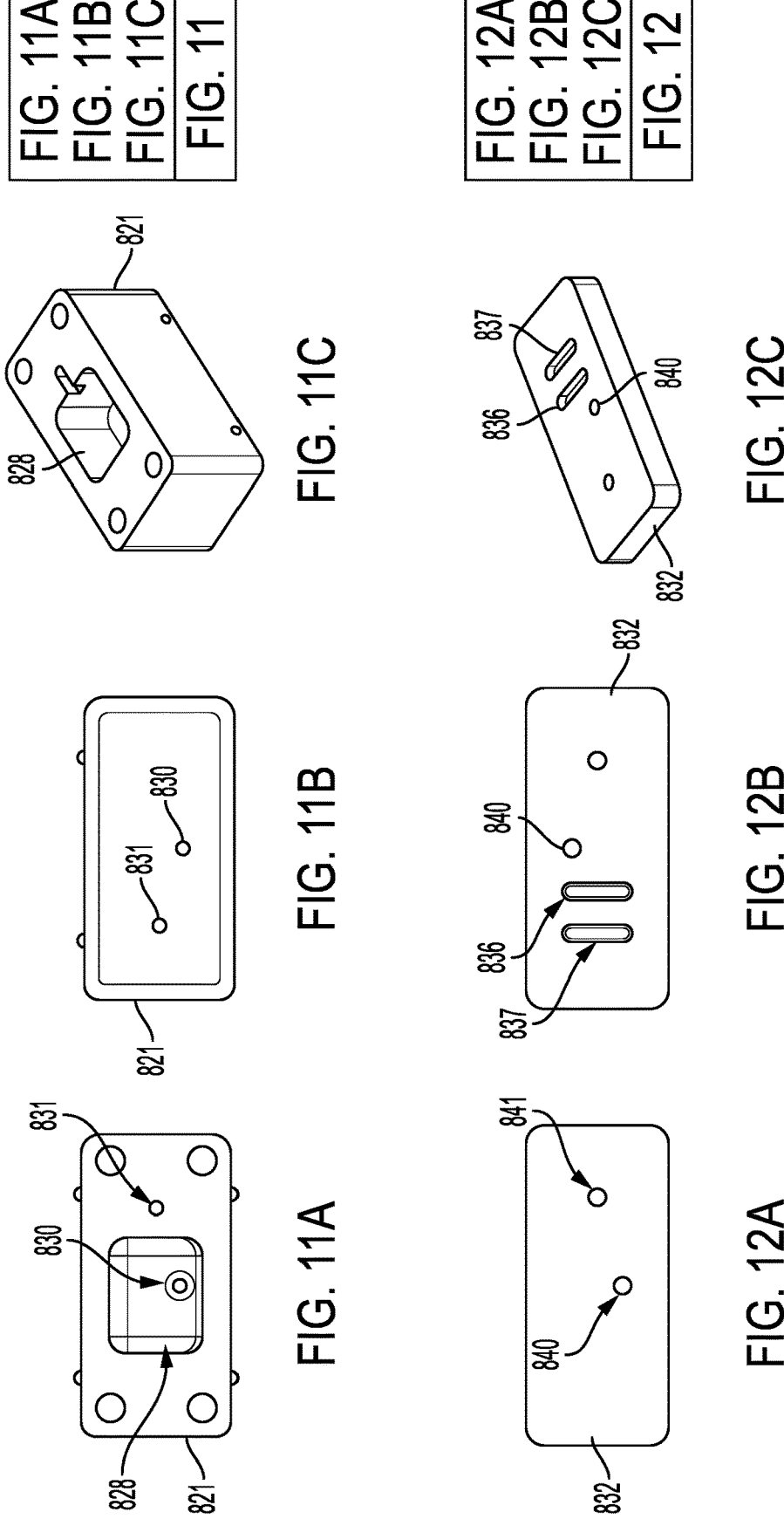

| FIG. 13A |
|----------|
| FIG. 13B |
| FIG. 13 |

PRESSURE CONTROL
DEVICE

PRESSURE CONTROL
DEVICE

2100

2100a — TRAIN MACHINE LEARNING MODEL

2100b — STORE MACHINE LEARNING MODEL

2101

RECEIVE IMAGE DATA FOR FLUID FLOW — 2100c

DETECT EDGE OF FLUID FLOW IN REACTION CHANNEL — 2100d

HAS FIRST EDGE REACHED PREDETERMINED POSITION ? — 2100e

NO

YES

CONTINUE TESTING PROCESS — 2100f

2300

CARTRIDGES AND USES THEREOF

TECHNICAL FIELD

This specification relates generally to example cartridges and to uses thereof.

BACKGROUND

Diagnostic testing systems may use cartridges to perform testing. A cartridge includes one or more channels for transporting one or more liquids that may be used during a testing process.

SUMMARY

An example cartridge includes a base having a channel configured to receive fluid, where the fluid includes a test sample to be tested on the cartridge, and a structure including at least part of a fluidic duct. The structure is configured to move relative to the base between a first position and a second position. In the first position, the channel and fluidic duct are aligned to create a fluidic connection between the channel and the fluidic duct and, in the second position, the channel and the fluidic duct are unaligned to block a fluidic connection between the channel and the fluidic duct. The example cartridge may include one or more of the following features, either alone or in combination.

The structure may include a container having a chamber to hold fluid. The fluid may include at least one of a reagent or a reaction buffer.

The example cartridge may include a container having a chamber to hold the at least part of fluid. The container may include a fluidic duct. The structure may be between the container and the cartridge and configured so that, in the first position, the fluidic duct of the container, the fluidic duct of the structure, and the channel are aligned fluidically. The container may be stationary.

The example cartridge may include a second channel configured to hold fluid. The structure may be configured to move relative to the base between the first position, the second position, and a third position. In the third position, the fluidic duct and the second channel may be aligned to create a fluidic connection between the second channel and the fluidic duct.

The structure may include a seal that is between the structure and the cartridge. The seal may be liquid-tight. The seal may include at least part of the fluidic duct.

The example cartridge may include a compression mechanism to apply force to the structure to push part of the structure against the cartridge. The compression mechanism comprises at least one spring.

The structure may be configured to receive force and to slide between the first position and the second position in response to the force.

The example cartridge may include a reservoir for receiving a test sample. At least some of the test sample may include a first part of the fluid. The channel may include a first section and a second section. The first section may be fluidically connected to the reservoir. In the first position, the fluidic duct is between the first section and the second section of the channel to create a fluidic connection to enable the second section of the channel to receive the first part of the fluid.

The structure may include a container having a chamber to hold at least a second part of the fluid. The chamber may include an outlet that is fluidically connected to the chamber.

In the second position, the outlet of the chamber may be fluidically connected to the second section of the channel to enable the second section of the channel to receive the at least the second part of the fluid from the chamber.

The structure may include at least part of a second fluidic duct, the channel may be a first channel, and the cartridge may include a second channel. In the second position, the second fluidic duct may be between the first channel and the second channel to fluidically connect the first channel and the second channel.

The first channel may be serpentine in shape. The serpentine shape may include expanding and constricting geometries. The cartridge may include a first port to connect the first channel to a first pressure control device and a second port to connect the second channel to a second pressure control device.

An example cartridge includes a base having a channel to hold fluid, and a structure that is movable relative to the channel. The structure includes a membrane. At least a part of the membrane may be biased to be raised relative to the base absent applied force. The at least part of the membrane may be movable between a raised position and a compressed position. The base may include a mesa between two sections of the channel. When the membrane is in the raised position, the two sections of the channel fluidically connect in a fluid channel between the membrane and the mesa. When the membrane is in the compressed position, the membrane contacts the mesa and blocks fluidic connection between the two sections of the channel.

An example method includes the following operations: adding test sample to a channel of a cartridge; adding reagent to the channel; identifying an amount of test sample and reagent in the channel; mixing the test sample and the reagent in the channel to produce a mixture comprised of the test sample and the reagent; determining if there is an anomaly in the mixture; and outputting an alert if an anomaly is detected or proceeding with testing based on the mixture if an anomaly is not detected. The example method may include one or more of the following features either alone or in combination.

Identifying an amount of test sample and reagent in the channel may include detecting a first edge of a fluid flow in the, where the fluid flow includes test sample and reagent in the channel; detecting a second edge of the fluid flow in the channel; and determining a volume of fluid in the channel based on the first edge and the second edge. Values for the first edge may be detected in multiple images of the channel and values for the second edge are detected in the multiple images. A value of the volume of the fluid in the channel may be detected based on first and second edges detected in each image. The method may include averaging values for the volume to determine the volume of fluid in the channel. Determining if there is an anomaly in the mixture may include analyzing the multiple images using a machine learning (ML) algorithm.

In some implementations, one or more fluidic objects may be detected using machine learning based using one or more images. In implementations where one image is used, additional other images may be used, such as images captured subsequent to the one image during an assay, to improve upon the detection.

Any two or more of the features described in this specification, including in this summary section, can be combined to form implementations not specifically described herein.

The systems, processes, devices including cartridges, and variations thereof described herein, or portions thereof, can be implemented using, or may be controlled by, a computer program product that includes instructions that are stored on one or more non-transitory machine-readable storage media and that are executable on one or more processing devices. The systems, processes, devices including cartridges, and variations thereof described herein, or portions thereof, can be implemented as, or as part of, an apparatus, method, or electronic systems that can include one or more processing devices and memory to store executable instructions to implement various operations. The systems, processes, operations, devices including cartridges, and variations thereof described herein may be configured, for example, through design, construction, arrangement, composition, placement, programming, operation, activation, deactivation, and/or control.

The details of one or more implementations are set forth in the accompanying drawings and the description below. Other features, objects, and advantages will be apparent from the description and drawings, and from the claims.

DESCRIPTION OF THE DRAWINGS

FIG. 11, comprised of FIGS. 11A, 11B, and 11C, shows top, bottom, and perspective views, respectively, of an example container included in the cartridge of FIG. 8.

FIG. 12, comprised of FIGS. 12A, 12B, and 12C, show top, bottom, and perspective views, respectively, of an example seal included in the cartridge of FIG. 8.

Like reference numerals in different figures indicate like elements.

DETAILED DESCRIPTION

Figure 1A:
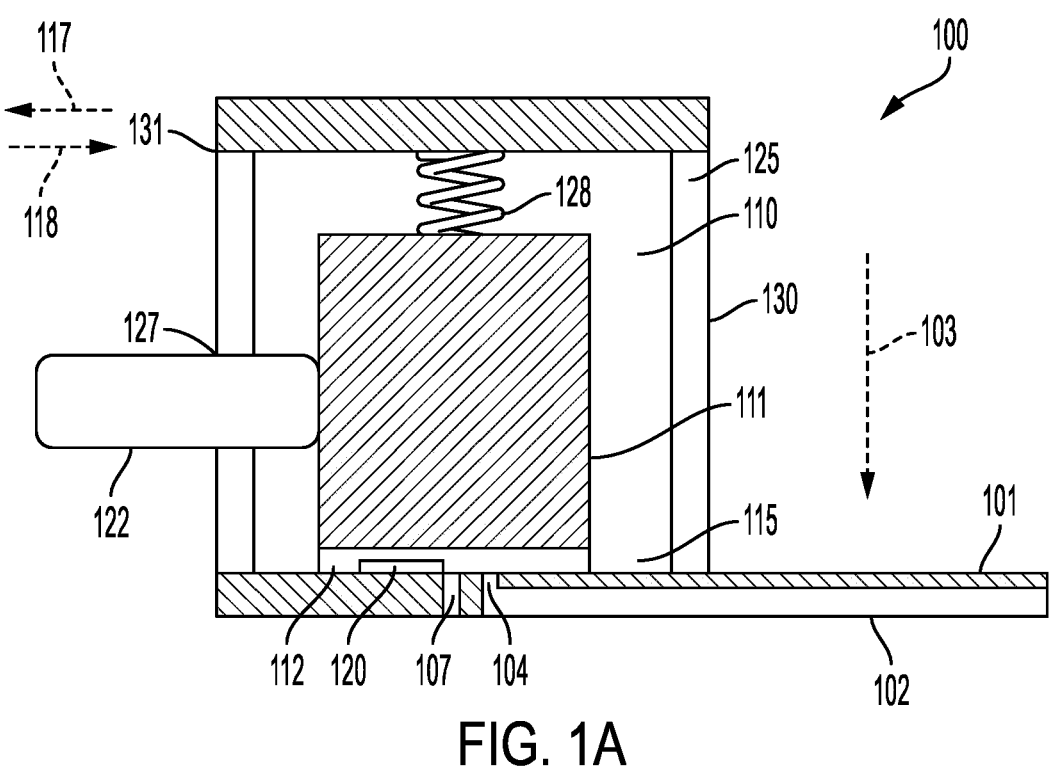
FIG. 1, comprised of FIGS. 1A and 1B, is a block diagram showing a cross-sectional side view of a first example implementation of a cartridge.

Described herein are examples of cartridges having one or more fluidic channels and/or valve functionality, such as slider valves or valves in other forms that can perform in a way that is functionally similar to these valves. In an example cartridge ("cartridge") of this type, a slider valve is controllable to open a fluidic channel ("channel") of a cartridge ("cartridge") to allow fluid to enter or exit the channel or to close the channel to prevent the fluid from entering or exiting the channel. Use of valve structures of the type described herein may simplify both the construction the cartridge and control over the cartridge. For example, the valve structure may create fluidic connections on a cartridge using a single movable part. This may, in turn, simply the control mechanism(s) used to control create the fluidic connections on the cartridge.

Examples of fluids that may be stored on and/or added to a cartridge include, but are not limited to, a test sample, such as whole blood or a component of whole blood such as plasma, or a derivative of whole blood. Other examples of fluids that may be stored on and/or added to a cartridge include a liquid reagent, a liquid reaction buffer, or any other type of liquid sample to be tested or used in testing.

The cartridge may also include one or more dry reagents, such as preloaded reagents at selected location(s), to mix with liquids prior to testing.

Examples of reagents that may be used include, but are not limited to, colorimetric dyes, enzymes, bioreagents, enzymes, antibodies, and proteins. Examples of dry reagents include latex particles, chromogenic substrate, anti-Xa enzyme deposited in liquid form on the cartridge and then dried in a channel.

Examples of tests that may be performed using the cartridge include, but are not limited to, D-Dimer testing, which looks for the presence of D-dimer in blood, anti-Factor Xa testing, which measures plasma heparin (unfractionated heparin [UH] and low-molecular weight heparin [LMWH]) levels in a test sample, and hemostasis testing. Other examples of tests that may be performed using the cartridge include, but are not limited to, agglutination assays, immunoassays, enzymatic assays, kinematic assays, and any multi-stage wet chemical assay.

FIGS. 1 to 7 below show examples of different types of slider valves that may be used to create fluidic connections to and/or from channels on a cartridge. FIGS. 8 to 19 show an example of a slider valve used to create fluidic connections to and from channels on a cartridge and fluid flow through the channels. FIGS. 20, 21A, 21B, 22, 23A, and 23B show examples of processes that may be used with any fluid channels including, but not limited to, the fluid flow channels on the cartridges described herein or any other type of cartridge having one or more channels through which fluid flows.

FIG. 1 shows an example cartridge 100 having a structure 111 containing a trench 120 that aligns to fluidic inlets/outlets ("I/Os") 104, 107 thereby creating a fluidic connection between the fluidic I/O via the trench. One of the I/Os may connect to an exterior of the cartridge and another one of the I/Os may connect to a channel in the cartridge. The exterior of the cartridge may contain, e.g., a repository holding test sample, liquid reagent, or both. The fluidic connection enables fluids to flow between the exterior of the cartridge (e.g., the repository) and the channel.

Cartridge 100 includes base 101, movable structure 111, optional housing 130 and their associated components. FIG. 1 also shows one or more actuators 122 that interact with cartridge 100 in the manner described below.

Base 101 may be made of plastic, polymer, glass, acrylic or any other material that is resistant to deformation. In some implementations, all or at least part of base 101 may be made of transparent or translucent material to enable optical testing using the cartridge. Base 101 includes I/O 107 and channel 102 (which includes I/O 104). I/O 107, I/O 104, and channel 102 are all examples of fluidic ducts ("ducts") in that each of these structures is configured for fluid flow therethrough.

In some implementations, channel 102 may be a microchannel configured to receive test sample and/or reagent, to mix the test sample and reagent, and/or to enabling testing on the resulting mixture. In some implementations, channel 102 may have a hydraulic diameter below one millimeter (1 mm); however, channel 102 is not limited to this size. When viewed from the direction of arrow 103, channel 102 may be linear, curved, serpentine, meandering, zig-zagged, or have any other shape. The cross-section of channel 102 in the direction perpendicular to the flow direction inside the channel can be circular or non-circular, such as rectangle or square.

I/O 104 is fluidically connected to channel 102 to allow fluid to enter channel 102. I/O 104 is therefore referred to as the channel I/O. For example, as shown in FIG. 1B, fluid may flow into channel I/O 104 in the direction of arrow 106 or out of channel I/O 104 in the opposite direction of arrow 106.

I/O 107 is fluidically connectable to a fluid repository (not shown) that is external to cartridge 100 to allow fluid to enter cartridge 100 or to receive fluid from cartridge 100. For example, as shown in FIG. 1B, fluid may flow into cartridge I/O 107 from a fluid repository in the direction of arrow 109 or out of cartridge I/O 107 in the opposite direction from arrow 109. For example, test sample and/or reagent may flow into cartridge I/O 107 from a source. For example, a mixture of test sample and reagent may flow out of cartridge I/O 107. I/O 107 is referred to as the cartridge I/O.

Cartridge 100 includes movable structure 110. Structure 110 is moveable in the direction of arrows 117, and contains a trench that fluidically connects I/O 104 and I/O 107. In this example, structure 110 includes a block 111 and a fluid-tight seal ("seal") 112. Block 111 may be hollow or solid; it may be cuboid, rectangular cuboid, or of any other shape. Block 111 may be made of plastic, acrylic, metal, or other material that is resistant, or at least partially resistant, to deformation.

Seal 112 may be made of elastomer, rubber, silicone, or any other type of elastic material that is readily deformable and able to form a fluid-tight seal with a surface 115 of base 101. The fluid-tight seal reduces the chances of inadvertent fluid leakage out of the I/O and channel 102 during fluid movement Seal 112 and base 101 may be made of materials that together produce a low enough coefficient of friction— for example, from 0.05 to 0.2—to allow structure 110 to slide across surface 115 of base 101 in the directions of arrow 117 and/or 118. This sliding enable creation of the fluidic connections between I/O 104, I/O 107, and trench 120.

Structure 110 also includes a trench 120. Trench 120 is a notch or indentation within a part of structure 110, which creates an open space between structure 110 and base 101, through which fluid may flow. In this example, the trench is entirely within seal 112; however, in other implementations, the trench may extend into block 111.

The cartridge can be used with one or more actuators, such as actuator 122, to move structure 110. The actuator may or may not be considered part of the cartridge. Actuator 122 may be an electromechanical linear actuator. For example actuator 122 may be a solenoid-driven actuator. Examples of linear actuators that may be used include, but are not limited to, a plunger or a slider operated by a stepper motor.

Actuator 122 is configured and controlled by a control system, such as an electronic control system 2201 of FIG. 24 (described below), to drive to structure 110. For example, actuator 122 may be electronically controlled to move in the directions of arrows 117 and/or 118. In an example, when moved in the direction of arrow 117, actuator contacts structure 110. Continued force applied to actuator 122 in the direction of arrow 117 causes structure 110 to move in the direction of arrow 117.

Cartridge 100 may optionally include housing 125 and a compression mechanism 128. These components may be omitted from cartridge 100 in some implementations. Housing 125 may enclose structure 110 and act to limit its movement in the directions of arrows 117, 118. The compression mechanism may force the structure 110 against the seal 112 to create a liquid-tight fit between the two.

Housing 125 may be made of plastic, acrylic, metal, or other material that is resistant to deformation. Housing 125 may be connected—e.g., fixed—to base 101 so as to prevent relative movement between housing 125 and base 101 when structure 110 moves. Housing 125 may partially enclose structure 110 but be large enough to allow movement of structure 110 relative to the housing. Housing 125 may also include one or more openings 127 to allow one or more actuators, such as actuator 122, to move into, out of, and through the housing.

Compression mechanism 128 is configured to apply downward force to structure 110 in the direction of arrow 103 to push seal 112 against surface 112 of base 101 to promote the fluid-tight seal between seal 112 and base 101, without preventing movement of structure 110 across the surface of base 101. Compression mechanism 128 may be or include one or more high-density polyethylene (HDPE) spacer(s) or spring(s) to apply the force. The force can be controlled by spring force, or simply by the distance control as a spacer. HDPE material may be used to limit friction when the subassembly moves. Compression mechanism 128 may be fixed (e.g., connected) to block 111 but not to housing 125 to allow compression mechanism to move along with block 111 within the housing when the housing is present.

Structure 110 is configured to operates as slider valve to control fluid flow into or out of channel 102. More specifically, actuator 122 is controlled by the control system to move structure 110 between the "closed" position of FIG. 1A and the "open" position of FIG. 1B. In the closed position, structure 110—in this example, seal 112—covers, and creates a fluid-tight seal over, cartridge I/O 107 and channel I/O 104. Structure 110 thus blocks cartridge I/O 107 and channel I/O 104 (that is, the cartridge I/O and channel I/O are unaligned to trench 120), thereby preventing fluid flow therethrough. This position may be used during storage and transport of the cartridge, for example, prior to testing that is performed using the cartridge. In the open position of FIG. 1B, trench 120 aligns with cartridge I/O 107 and channel I/O 104. This alignment creates a fluidic connection among cartridge I/O 107, trench 120, channel I/O 104, and channel 102, which enables fluid to flow into channel 102 from the exterior of the cartridge and enables fluid to flow from channel 102 to the exterior of the cartridge. This position may be used during testing using the cartridge, for example, to introduce test sample, reagent, and/or other liquids into the cartridge.

Figure 1B:
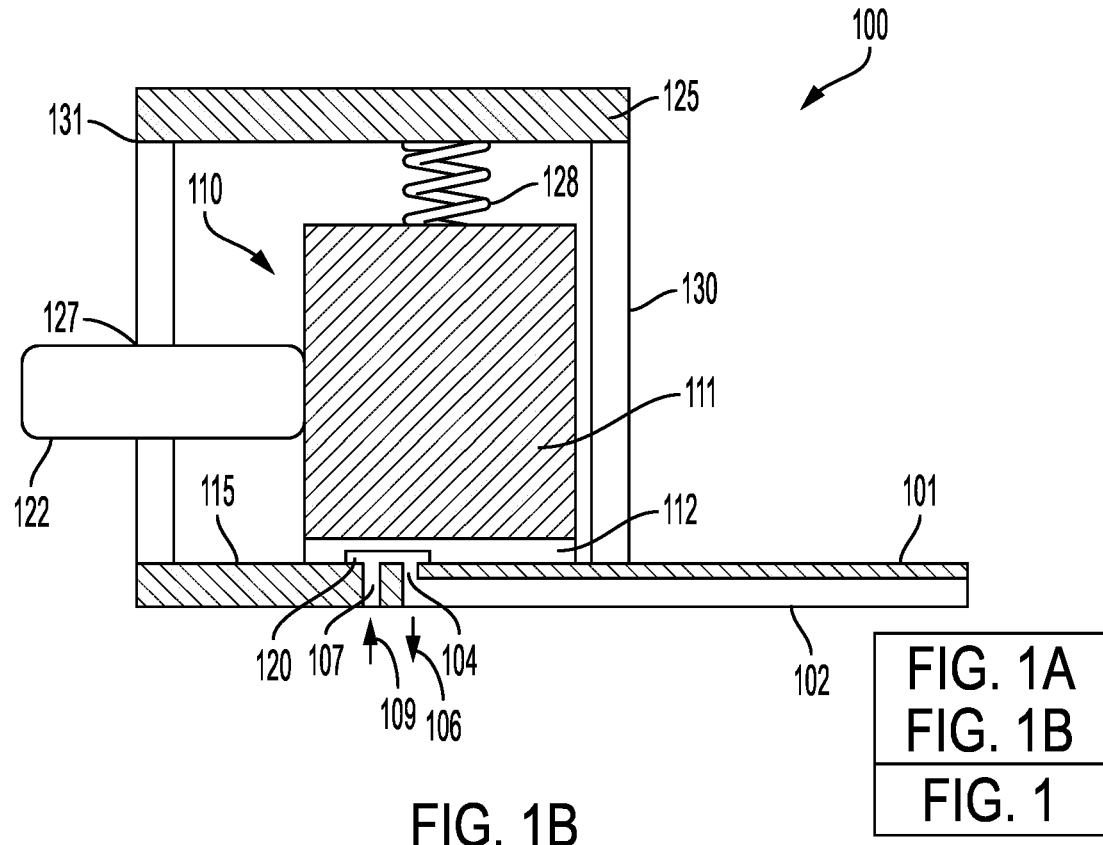
Figure 2A:
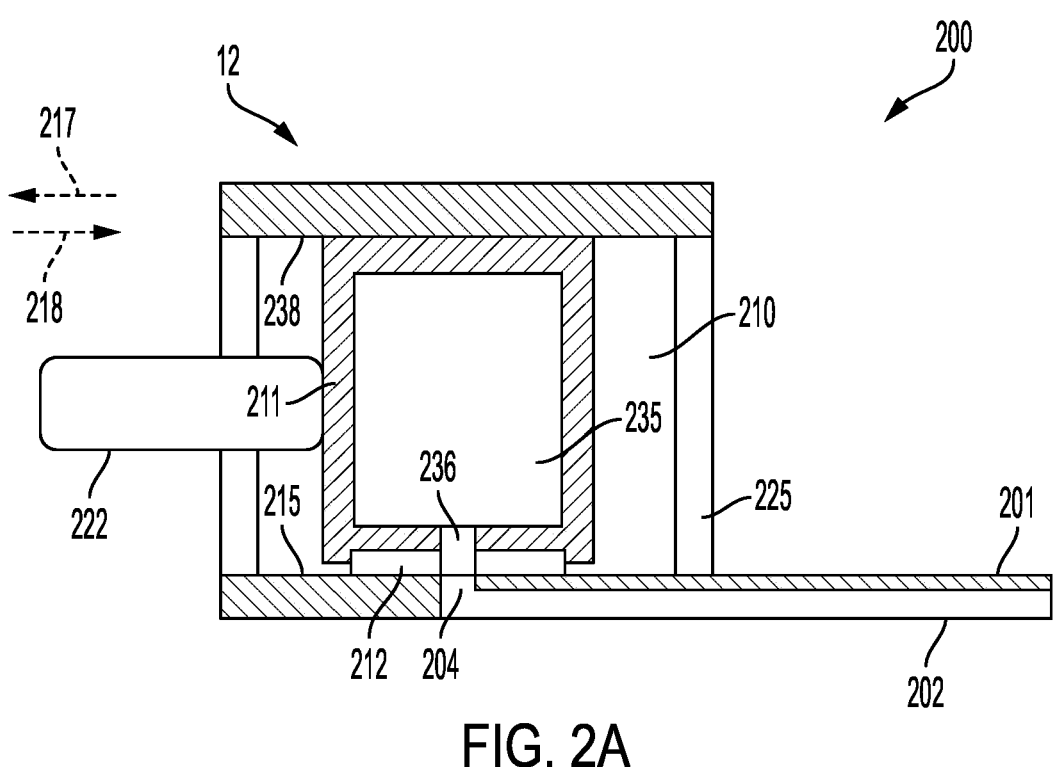
FIG. 2, comprised of FIGS. 2A and 2B, is a block diagram showing a cross-sectional side view of a second example implementation of a cartridge.
Figure 2B:
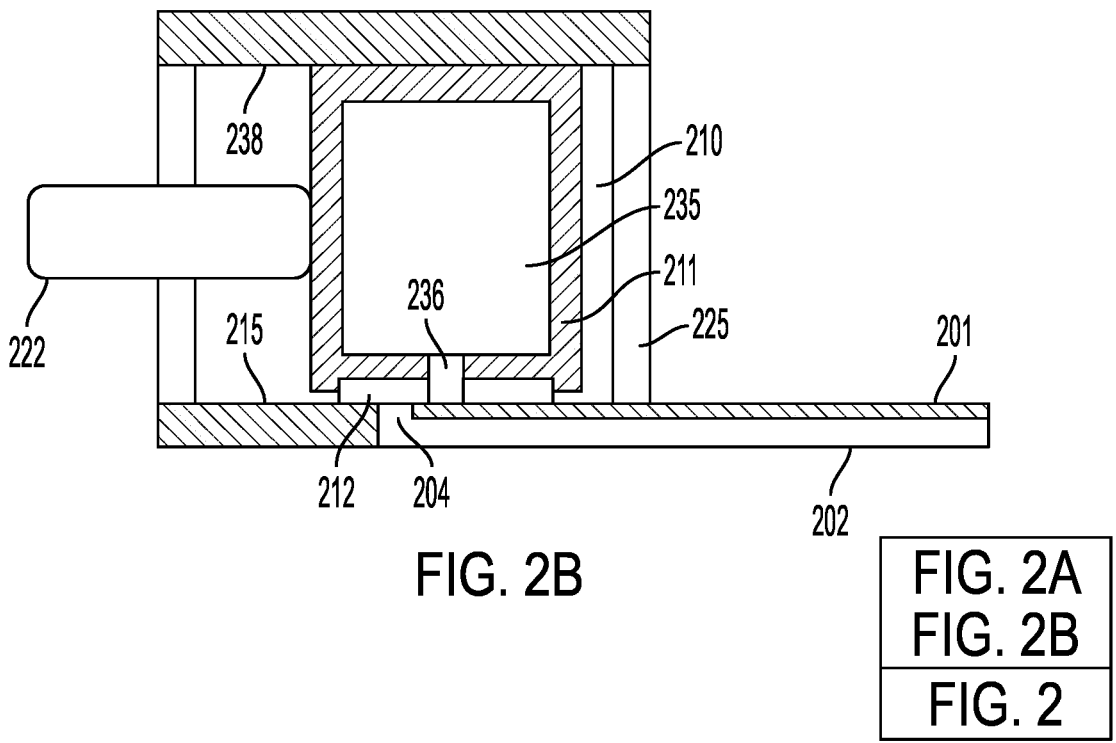
Figure 3A:
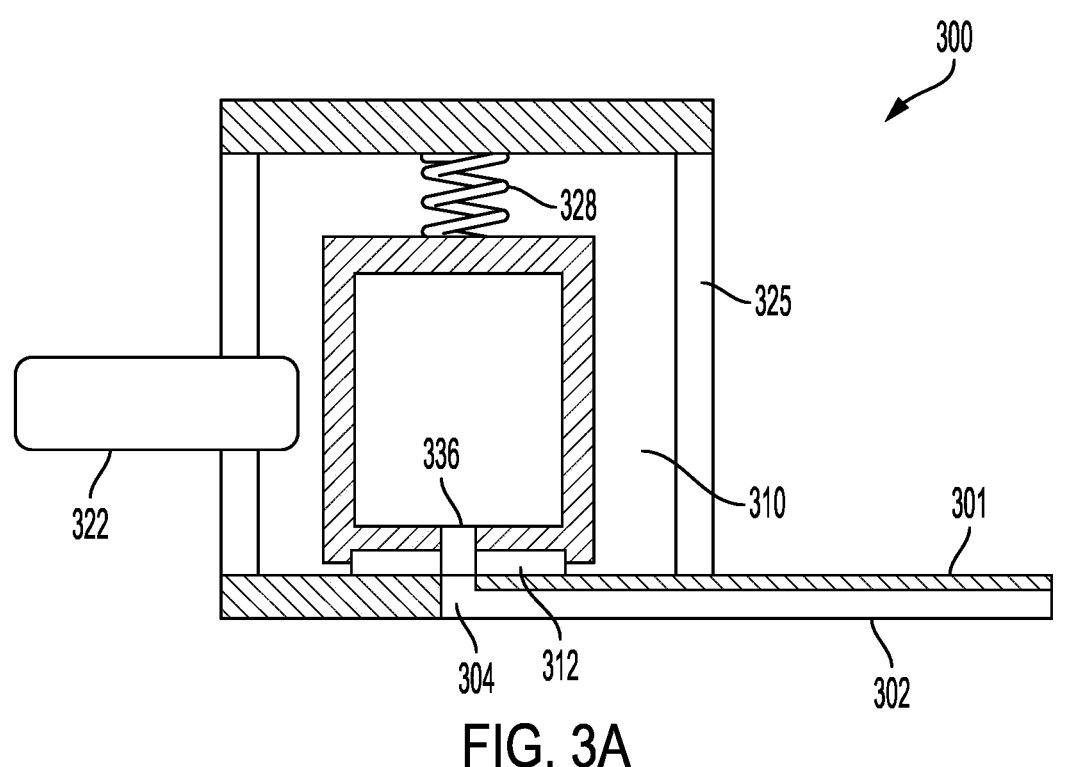
FIG. 3, comprised of FIGS. 3A and 3B, is a block diagram showing a cross-sectional side view of a third example implementation of a cartridge.
Figure 3B:
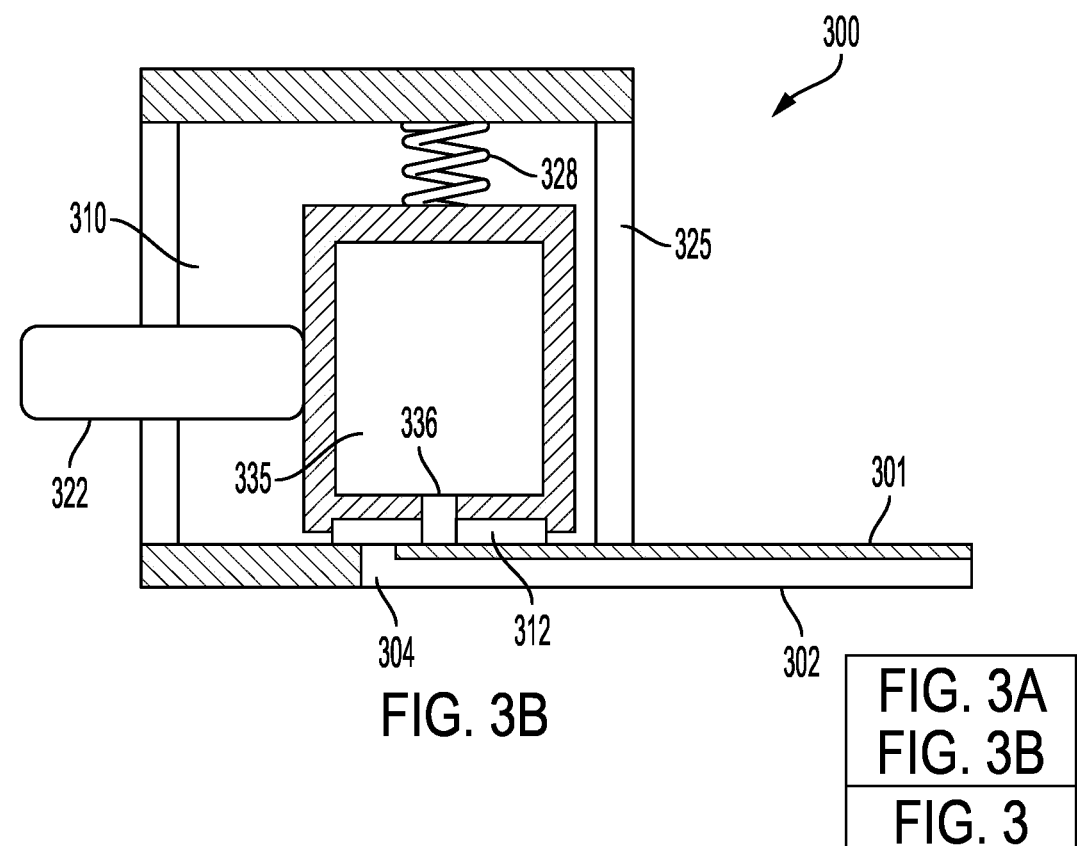
Figure 4A:
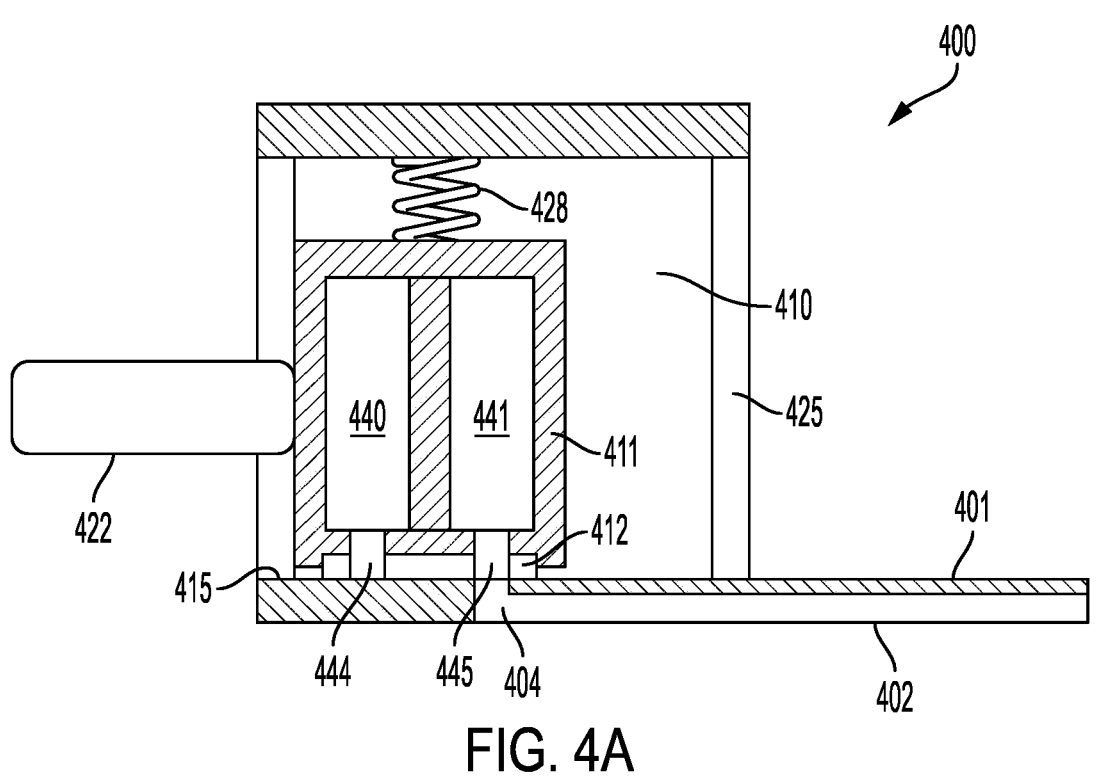
FIG. 4, comprised of FIGS. 4A and 4B, is a block diagram showing a cross-sectional side view of a fourth example implementation of a cartridge.
Figure 4B:
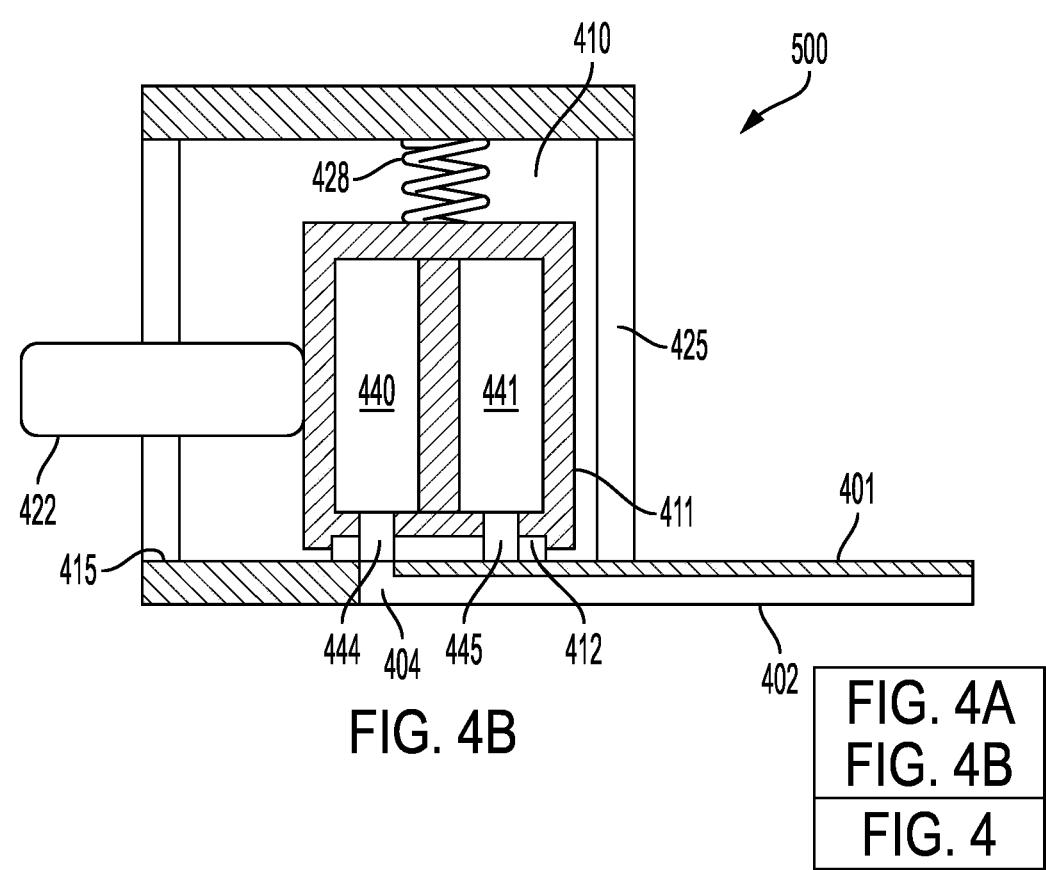

In this example, to move from the closed position of FIG. 1A to the open position of FIG. 1B, actuator 122 is controlled to move in the direction of arrow 118 thereby causing structure 110 also to move in the direction of arrow 118. The amount of movement is enough to align trench 120 with cartridge I/O 107 and channel I/O 104. The resulting fluidic connection allows fluid to flow from cartridge I/O 107 in the direction of arrow 109, through trench 120, through channel I/O 104 in the direction of arrow 109, and into channel 102, or in the opposite direction. Fluid flow may be controlled using positive or negative pressure applied by one or pressure control devices (not shown) and/or capillary action and/or using other mechanisms. The fluid may be, for example, test sample or liquid reagent. In some implementations, channel 102 may include a dry reagent that mixes with the test sample and/or liquid reagent to enable testing to be performed such as that described below with respect to FIGS. 14 to 20.

In the example of FIG. 1, cartridge 100 is biased closed. What this means is that, absent applied force, cartridge 100 is in the configuration of FIG. 1A. In some implementations, cartridge 100 may be biased open. What this means is that, absent applied force, cartridge 100 is in the configuration of FIG. 1B. Force may be applied to structure 110 in the direction of arrow 117 by one or more actuators to move structure 110 into the closed position of FIG. 1A. The biased closed configuration may be used where content, such as dry reagent is pre-stored in channel 102 the cartridge, whereas the biased open configuration may be used where there is no content pre-stored in the cartridge.

In some implementations, actuator 122 may be physically connected to structure 110 to pull structure 110 from the open position to the closed position. In some implementations, actuator 122 may be located on side 130 of cartridge 100 to push structure 110 from the open position to the closed position. In some implementations, there may be two actuators—one on each of sides 130 and 131 of cartridge 100—that are configured and controllable by the control system to move structure 110 between the open position and the closed position.

FIG. 2 is a block diagram of another example cartridge 200 having a base like base 101 of FIG. 1 and a movable structure. The movable structure has a chamber that may contain pre-stored liquid and I/O to the chamber, which is different from the structure 111 of FIG. 1, which does not contain the pre-stored liquid. The structure is movable to align the I/O of the chamber with I/O of a cartridge channel, thereby creating a fluidic connection between the channel and the chamber. A configuration such as this may be useful in moving or releasing liquid, such as reagent, from the chamber to the channel. Test sample may be provided to the channel directly (e.g., through pipetting) or through another inlet (not shown) for mixing with the liquid from the container.

Cartridge 200 includes base 201, movable structure 210, optional housing 230, and their associated components. FIG. 2 also shows one or more actuators 222 that interact with cartridge 100 in the manner described below.

Base 201 includes a channel 202 and channel I/O 204, which may be similar or identical to channel 102 and channel I/O 104 of FIG. 1. The composition of base 201 may be similar or identical to that of base 101 of FIG. 1.

In the example of FIG. 2, structure 210 includes a container 211 having a fluid-tight chamber 235 configured to hold fluid, examples of which are described above. The internal volume of the container may be designed based on volume requirements of assays to be used in the cartridge. In some examples, container 211 serves as a storage container for storing reagent, reaction buffer, or other material needed to perform testing on a test sample. For example, the container may include liquid (e.g., reagent) that is required for a particular assay. The container may enable such materials to be pre-measured and pre-packaged, thereby facilitating the testing process, e.g., by not requiring a system that performs the test or the user to measure the materials.

Container 211 may be made of plastic, acrylic, metal, or other material that is resistant to deformation. Container 211 also includes I/O 236 that is fluidically connected to the interior of chamber 235.

Structure 210 includes a seal 212 between container 212 and surface 215 of base 201. Seal 212 may be the same type of seal as seal 112 of FIG. 1. In this example, container I/O 236 extends completely through seal 212 to chamber 235. Structure 210 is against surface 215 of base 201 to create a fluid-tight seal to the base.

Housing 225 may be the same type of housing as housing 125 of FIG. 1 except that housing 225 need not include compression mechanism 128. In this example, the ceiling 238 of housing 225 is constructed and arranged to abut the top of structure 210 so that structure 210 is forced against surface 215 with enough force to create the fluid tight seal but not enough force to prevent structure 210 from sliding across surface 215.

Actuator 222 may be the same type of actuator as actuator 122 of FIG. 1. Actuator 222 is controlled by the control system to move structure 210 between the open position of FIG. 2A and the closed position of FIG. 2B. In the open position, container I/O 236 aligns with channel I/O 204 and opens a fluidic connection between the channel and the container. That is, this alignment creates a fluidic connection among chamber 235, container I/O 236, channel I/O 204, and channel 202, thereby allowing fluid to flow between chamber 235 and channel 202. In the closed position, structure 210—in this example, seal 212—covers, and creates a fluid-tight seal over, channel I/O 204 (also channel I/O 204 and container I/O 236 are unaligned), thereby closing the channel to the content of the container. Structure 210 thus blocks channel I/O 214, thereby preventing fluid between chamber 235 and channel 202

Actuator 22 is controlled by the control system to move in the direction of arrow 218 to move structure 210 from the open position to the closed position. In the example of FIG. 2, cartridge 200 is biased open. In some implementations, cartridge 200 may be biased closed. The cartridge may be biased closed when it is desired not to allow the contents of the container to enter the channel prior to testing. To move from the closed to the open position, force may be applied to structure 210 in the direction of arrow 217 by one or more actuators to move structure 210 into the open position. This force may be applied by one or more actuator(s) as described above with respect to FIG. 1 using one or more actuators on either side, or on both sides, of cartridge 200.

FIG. 3 is a block diagram of another example cartridge 200 having a base like base 101 of FIG. 1 and a movable structure. The movable structure has a chamber that may contain pre-stored liquid and I/O to the chamber. The structure is movable to align the I/O of the chamber with I/O of a cartridge channel, thereby creating a fluidic connection between the channel and the chamber. A configuration such as this may be useful in moving liquid, such as reagent, from the chamber to the channel. Test sample may be provided to the channel directly (e.g., through pipetting) or through another inlet (not shown) for mixing with the liquid from the container.

In this example, base 301 may have all of the attributes of base 201 of FIG. 2, including a channel 302 and a channel inlet 304. Structure 310 may have all of the attributes of structure 210 of FIG. 2. Actuator 322 may have all of the attributes of actuator 222 of FIG. 2. Housing 325 may have all of the attributes of housing 225 of FIG. 2, except that, in this example, a compression mechanism 328 may be used to apply downward pressure to create a fluid-tight seal between seal 312 of structure 310 and base 301, while still allowing structure movement that is controlled by actuator 322. Compression mechanism 328 may have the same structure and function as compression mechanism 128 of FIG. 1.

As was the case with respect to cartridge 200, cartridge 300 is biased open but may also be biased closed and its structure 310 may be moved by moving one or more actuators on either side, or both sides, of cartridge 300. Actuator 322 is controlled by the control system to move structure 310 between the open position of FIG. 3A and the closed position of FIG. 3B. In the open position, container I/O 336 aligns with channel I/O 304 and opens channel 302 to the content of the chamber 335. This alignment creates a fluidic connection among chamber 335, container I/O 336, channel I/O 304, and channel 302, thereby allowing fluid to flow between chamber 335 and channel 302. In the closed position, structure 310—in this example, seal 312—covers, and creates a fluid-tight seal over, channel I/O 304 (also channel I/O 304 and container I/O 336 are unaligned), thereby closing the channel 302 to the content of chamber 335. In other words, structure 310 blocks channel I/O 314, thereby preventing fluid between chamber 335 and channel 302.

FIG. 4 is a block diagram of a cartridge 400, which is variant of the cartridge of FIG. 3. The movable structure in cartridge 300 contains multiple—for example, two-chambers, each of which may contain a pre-stored liquid, such as two different reagents. The I/O of each chamber is separately alignable to the I/O of the cartridge channel to create a fluidic connection between the respective chamber and the channel. A configuration such as this may be useful in moving liquids, such as reagent from multiple chambers to the channel in a predefined sequence (which may be specified by the control system). Test sample may be provided to the channel directly (e.g., through pipetting) or through another inlet (not shown) for mixing with the liquids (e.g., the reagents) from the containers.

In this example, base 401 may have all of the attributes of base 301 of FIG. 3, including a channel 402 and a channel/ IO 404. Actuator 422 may have all of the attributes of actuator 322 of FIG. 3. Housing 425 may have all of the attributes of housing 325 of FIG. 3. Compression mechanism 428 may have all of the attributes of compression mechanism 328 of FIG. 3.

Structure 410 includes a container 411 having two chambers 440 and 441. In some implementations, there may be more than two chambers (e.g., three, four, five, and so forth chambers). Chambers 440 and 441 are fluidically isolated from each other.

Each chamber 440, 441 may be empty or hold a fluid such as those described herein. The fluids in the different chambers may be different, for example, different reagents, different reaction buffers, and so forth. Each chamber 440, 441 contains a respective container I/O 444, 445. Each container I/O 444 and 445 may be a fluidic duct of the type described herein. Each container I/O extends through seal 412 and through container 411 into its corresponding chamber.

Structure 410 is movable along the surface 415 of base 401 to align one of container I/O 444 or 445 to channel I/O 404, thereby creating a fluidic connection between the corresponding chamber and channel 402. For example, when container I/O 445 aligns to channel I/O 404 (FIG. 4A) a fluidic connection is created between chamber 441, container I/O 445, channel I/O 404, and channel 402, thereby allowing fluid to flow between chamber 441 and channel 402. For example, when container I/O 444 aligns to channel I/O 404 (FIG. 4B), a fluidic connection is created between chamber 440, container I/O 444, channel I/O 404, and channel 402, thereby creating a fluidic connection between chamber 440 and channel 402.

As was the case with respect to cartridge 300, structure 410 may be controlled to move by moving one or more actuators on either side, or both sides, of cartridge 400. In an example, actuator 422 may be configured and controlled by the control system to move structure 410 to align container I/O 444 or 445 to channel I/O 404. The movement may be based on the order in which different liquids are to be output to channel 402, for example, liquid from container 440 may be output followed by liquid from container 441. This information may be programmed into the control system and used to control the operation of the actuator. Actuator 422 may also be controlled to move structure 410 so that neither container I/O 444, 445 aligns to channel I/O 404 (that is, channel I/O 404 is unaligned to either container I/O). In this configuration, seal 412 aligns to channel I/O 404, thereby preventing a fluidic connection.

FIG. 5 is a block diagram of another example cartridge 500. In this example, the movable structure contains a chamber that is empty or that holds pre-stored liquid. The I/O of the chamber is alignable to the I/O of one of multiple channels on the cartridge, thereby creating a fluid connection between the chamber and one of the channels on the cartridge. The structure is also movable to align the I/O of the chamber to the I/O of different channels, e.g., in sequence. A configuration such as this may be useful in moving liquids, such as reagent, from a single chamber to one or more channels on the cartridge. Test sample may be provided to a channel directly (e.g., through pipetting) or through another inlet (not shown) for mixing with the liquids from the chamber.

Structure 510 may have all of the attributes of structure 210 of FIG. 2. Actuator 522 may have all of the attributes of actuator 222 of FIG. 2. Housing 525 may have all of the attributes of housing 225 of FIG. 2. Compression mechanism 528 may have all of the attributes of compression mechanism 328 of FIG. 3 to create a fluid-tight seal between seal 512 and base 501, while still allowing movement of structure 510.

Figures 5A, 5B:
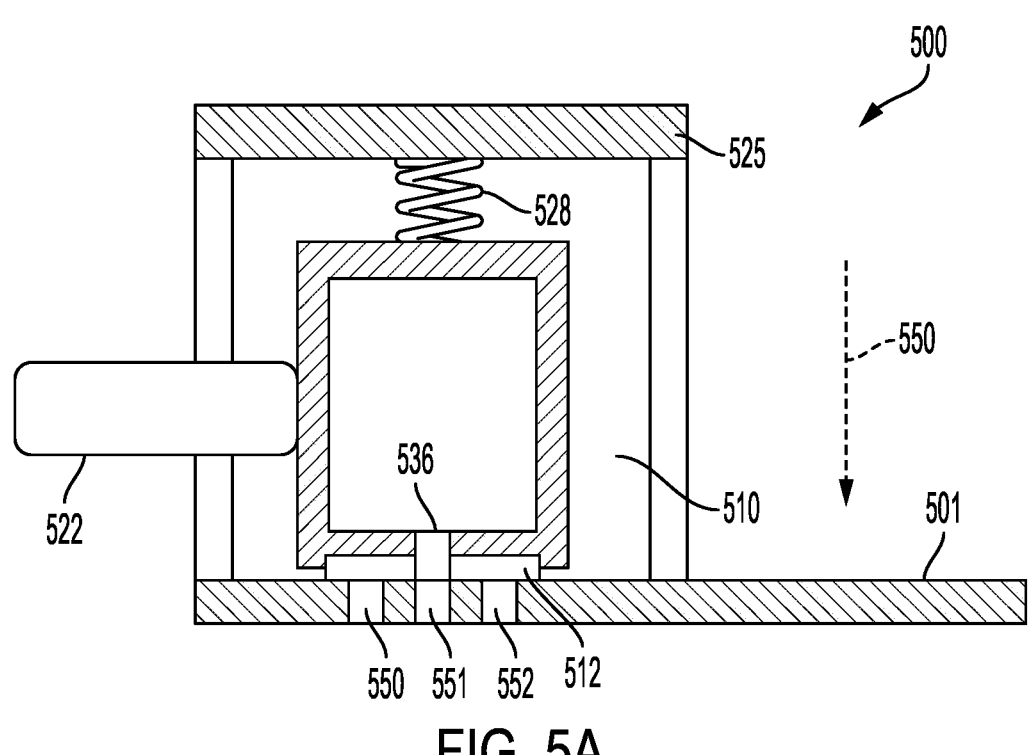
FIG. 5, comprised of FIGS. 5A, 5B, and 5C is a block diagram showing a cross-sectional side view and a top view of a fifth example implementation of a cartridge.
Figure 5C:
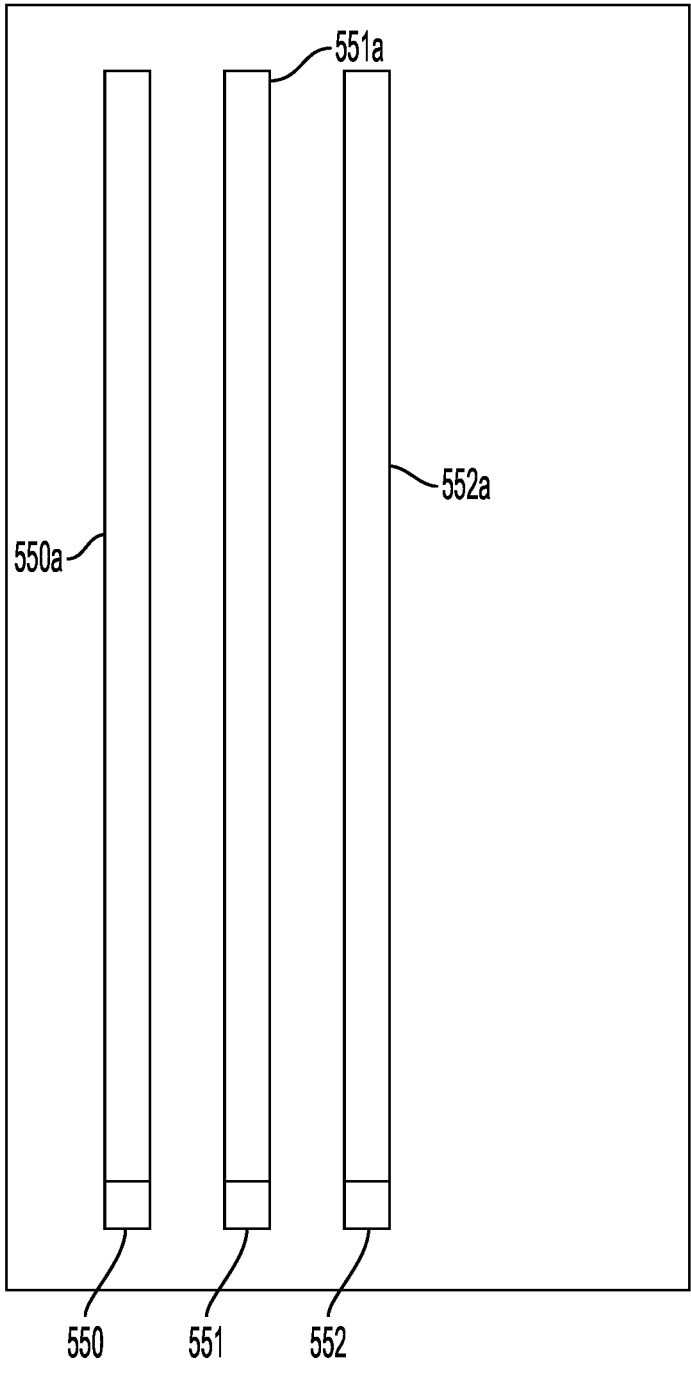

Referring also to FIG. 5C, which is a downward view along arrow 550 of FIG. 5A, in this example, base 501 includes multiple—in this example, three—channels 550*a*, 551*a*, and 552*a* having respective channel I/Os 550, 551, and 552. Although the channels are linear in FIG. 5C, the channels can have any shape, such as serpentine, meandering, zig-zag, or irregular shapes. In FIGS. 5A and 5B, the channels are shown in lateral (width-wise) cross-section (that is, the channels extend into and/or out of the page), whereas in FIGS. 1 to 4, the channels are shown in longitudinal (length-wise cross-section). Although three channels are shown in FIG. 5, any number of channels may be included on base 501, such as two, four, five, six, or more, each having a corresponding channel I/O. The three channels may be fluidically-isolated or two or more of them may fluidically connect downstream of structure 510.

As was the case with respect to cartridge 300 of FIG. 3, structure 510 may be controlled to move by moving one or more actuators on either side, or both sides, of cartridge 500. In this example, actuator 522 is controlled by the control system to move structure 510 so that container I/O 536 aligns to one of channel I/Os 550, 551, or 552, thereby creating a fluidic connection between chamber 535, container I/O 536, one channel I/O 550, 551, or 552, and one respective channel 550*a*, 551*a*, or 552*a* connected to channel I/O 550, 551, or 552. Actuator 522 may be controlled by the control system to move structure 510 so that container outlet 536 aligns to different channels at different times.

FIG. 5A shows the case where actuator 522 has moved container I/O 536 from alignment with channel I/O 550 to alignment with channel I/O 551. FIG. 5B shows the case where actuator 522 has moved container I/O 536 from alignment with channel I/O 551 to alignment with channel I/O 552. As above, the movement may be based on the order in which different liquids (e.g., regents) are to be output to the channels. This information may be programmed into the control system and used to control the operation of the actuator. Actuator 522 may also be controlled to move structure 510 so that no channel I/O aligns to container I/O 536 (that is, each channel I/O is unaligned to container I/O 536). In this configuration, seal 512 aligns to each channel I/O 550, 552, and 552, thereby preventing a fluidic connection with any channel.

In some implementations, structure 410 of FIG. 4 may replace structure 510 in FIG. 5. In such implementations, actuator 522 may be controlled to move to align different container I/Os to different channel I/Os. The alignments may be programmed into the control system and used to control the operation of the actuator. For example, in the case where there are two containers, actuator 522 may be move so as to align an I/O of one container with one of I/Os 550, 551, or 552, and to align another I/O of another container with a different one of I/Os 550, 551, or 552.

FIG. 6 is a block diagram of another example cartridge 600. In this example, the cartridge includes a container of the type described herein having a chamber that is empty or that contains pre-stored liquid. The cartridge also includes a base. Both the container 611 and the base 601 include I/O 636 and 634, respectively, that are aligned. There is an intermediate structure between the container and the base. The intermediate structure contains an I/O and is movable relative to the container and the base. When the I/O of the intermediate structure is aligned to the I/Os of the container and the base, a fluidic connection is created between the container and the base. When the I/O of the intermediate structure is not aligned to the I/Os of the container and the base, a fluidic connection is not created between the container and the base. This configuration may be advantageous in that it does not require movement of the container. For example, the movable structure may be smaller than the container and weigh less than the container. Therefore, the movable structure may require less force and therefore a smaller actuator to move than the container.

Container 611 may have all of the attributes of container 311 of FIG. 3, including a container I/O 636. Seal 612 may have all of the attributes of seal 312 of FIG. 3. Actuator 622 may have all of the attributes of actuator 322 of FIG. 3. Base 601 may have all of the attributes of base 301 of FIG. 3, including a channel 602 and a channel I/O 604. Base also includes a seal 650 on a surface thereof or embedded at least partially therein, which is separate from seal 612. Seal 650 may have all the attributes of seal 612. The channel I/O 604 may be partly within, and pass through, seal 650, as shown. Channel I/O 604 and container I/O 636 are vertically aligned.

In this example, there is a structure 610 between container 611 and base 601. Specifically, the structure 610 is sandwiched between container seal 612 and base seal 650. Structure 610 may be made of the same material as container 611 or of a different material, such as plastic, polymer, glass, acrylic. Structure 601 may be substantially planar on upper and lower surfaces thereof to enable creation of fluid-tight seals to each of container seal 612 and cartridge seal 650, while maintaining a low coefficient of friction to enable movement of the structure. Structure 610 may also include I/O 651 extending between its upper and lower surfaces through which fluid may flow.

Figure 6A:
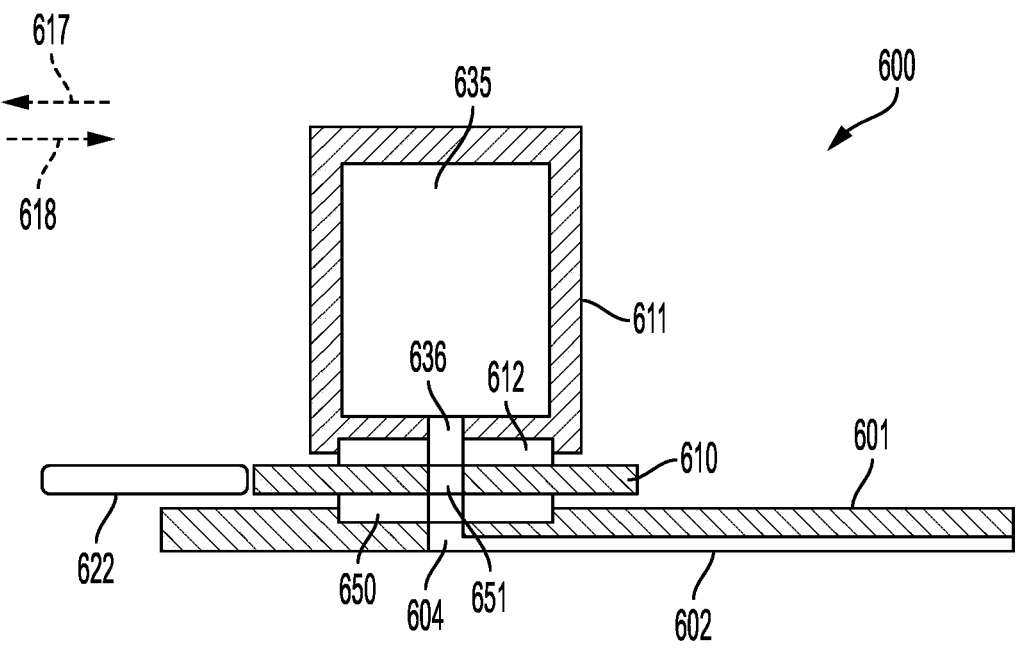
FIG. 6, comprised of FIGS. 6A and 6B, is a block diagram showing a cross-sectional side view of a sixth example implementation of a cartridge.
Figure 6B:
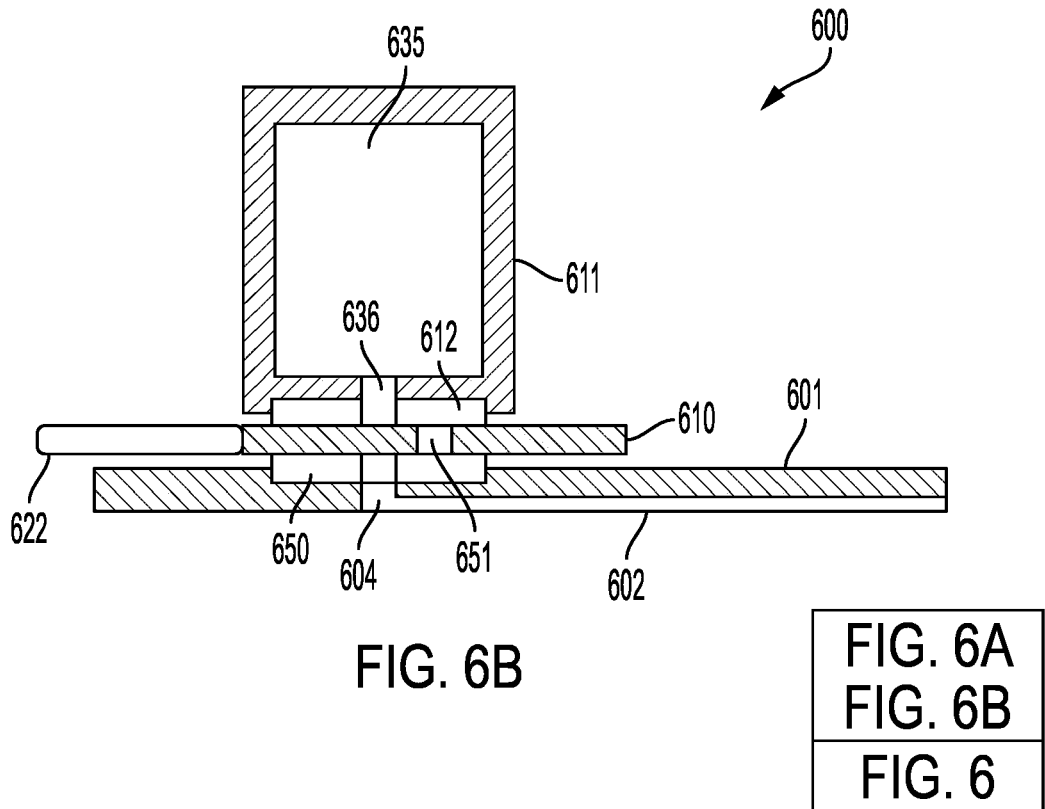

In this example, container 611 is stationary (as is base 601) and structure 650 is configured to move in the direction of arrows 617 and/or 618 relative to container 611 and base 601. As was the case with respect to structure 111, structure 601 may be controlled to move by moving one or more actuators on either side, or both sides, of cartridge 600. In the example of FIG. 6A structure 601 is in an open position, where chamber 635, container I/O 636, structure I/O 651, channel I/O 604, and channel 602 are in fluid communication. In the example of FIG. 6B, actuator 622 is controlled by the control system to move structure 601 to a closed position where structure I/O 651 is unaligned to container I/O 636 and channel I/O 604 and is blocked by seals 612 and 650. Alternatively, more than one actuator may be controlled by the control system to move structure from the closed position to the open position, as described above.

FIG. 7 is a block diagram of another example cartridge 700. In this example, a membrane or foil is controllable to open or to close a fluidic connection between two channels on a cartridge or two sections of the same channel. For example, a structure may be movable to raise the membrane to create a fluidic connection between the channels or to compress the membrane to close the fluidic connection between the channels. The liquid in the channels may be, for example, test sample or a combination of reagent and test sample that is introduced into the cartridge at a location that is not shown in FIG. 7.

Cartridge 700 includes a base 701, a flexible membrane ("membrane") 704, and a structure 720. Base 701 may have the same composition as the other bases described herein. Base 701 includes channels 709 and 710 separated by a mesa 712.

Flexible membrane ("membrane") 704 covers at least part of the base, including channels 709, 710, and mesa 712. Membrane 705 may be made of elastic, rubber, silicone, or other types of flexible material.

Figure 7A:
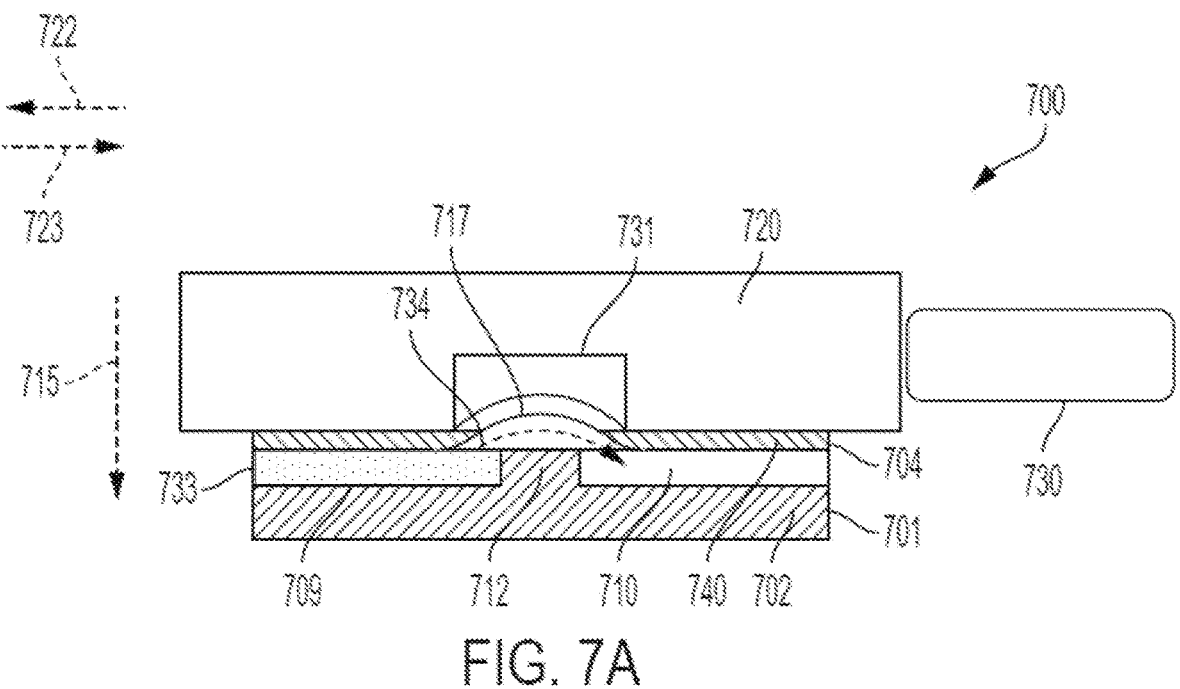
FIG. 7, comprised of FIGS. 7A and 7B, is a block diagram showing a cross-sectional side view of a seventh example implementation of a cartridge.

In the configuration of FIG. 7A (the open position), at the location of mesa 702, membrane 704 is biased to be raised relative to mesa 712. That is, absent downward force (arrow 715) on membrane 704 the membrane remains above mesa 712, leaving a space 717 between membrane 704 and mesa 712. This space 717 defines a duct that constitutes a fluid connection between first channel 709 and second channel 710.

Structure 720 is movable in the directions of arrow 722 and/or 723. Structure 720 may be a solid structure made, e.g., of plastic, acrylic, metal, or other material that is resistant to deformation. Structure 720 and membrane 704 may be made of materials that together produce a low enough coefficient of friction—for example, from 0.05 to 0.2—to allow structure 720 to slide across membrane 704 in response to force applied to structure 720 in the directions of arrow 722 and/or 723. Structure 720 also includes a notch 731 or indentation that is wider than mesa 712.

The force against structure 720 may be applied by actuator 730. Actuator 730 may have all of the attributes of actuator 222 of FIG. 2.

Figure 7B:
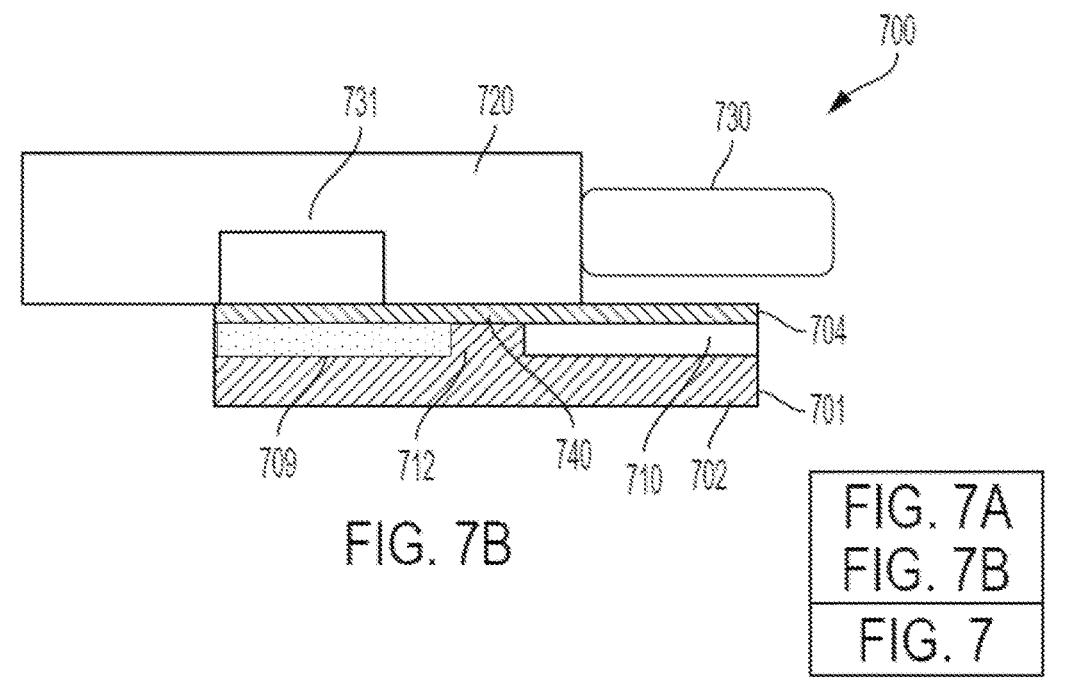

In the example configuration of FIG. 7A, the structure is positioned so that notch 731 aligns to mesa 712, thereby allowing the fluid connection between the first channel 709 and the second channel of the channel 710. Because the notch 731 is wider than the mesa, the membrane remains raised to enables a fluidic path between the channels. More specifically, fluid 733 in channel 709 may flow in the direction of arrow 734 into channel 710, or vice versa. Actuator 730 may be controlled by the control system to produce this alignment or cartridge 700 may be biased with this alignment. Actuator 730 may be controlled by the control system to move in the direction of arrow 722 to move notch 731 out of alignment with mesa 712. This movement causes, the bottom surface 740 of structure 720 to flatten membrane 704 and thereby force membrane 704 against mesa 712, as shown in FIG. 7B. The membrane and mesa create a fluid-tight seal that fluidically isolates the first channel 709 from the second channel 710, thereby preventing fluid flow between the two channels.

Alternatively, one or more actuators on one or both sides of structure 720 may be controlled by the control system to move structure 720 from a closed channel position (FIG. 7B) to an open channel position (FIG. 7A) in the manner described above.

FIGS. 8 to 13 are diagrams showing components of another example cartridge 800 that includes valve (e.g., slider valve) functionality. Cartridge 800 may have advantages in that may enable, using a single a slidable structure, the introduction of both test sample and reagent into the channel of the cartridge, part(s) of which can be where reaction or testing takes place. The sliding action also may enable, using a single a slidable structure, waste from the cartridge to move into a waste channel that is distinct from the test channel.

Cartridge 800 may be used in a diagnostic test instrument that performs multi-stage assay testing. Multi-stage testing includes mixing a test sample with one reagent to produce a first mixture, then mixing the first mixture with a second regent to produce a second mixture, and so on. Examples of multi-stage assay testing include, but are not limited to, D-Dimer testing, which looks for the presence of D-Dimer in blood, anti-Factor Xa testing, which measures plasma heparin (unfractionated heparin [UH] and low-molecular weight heparin [LMWH]) levels in a test sample, and hemostasis testing.

Figure 8:
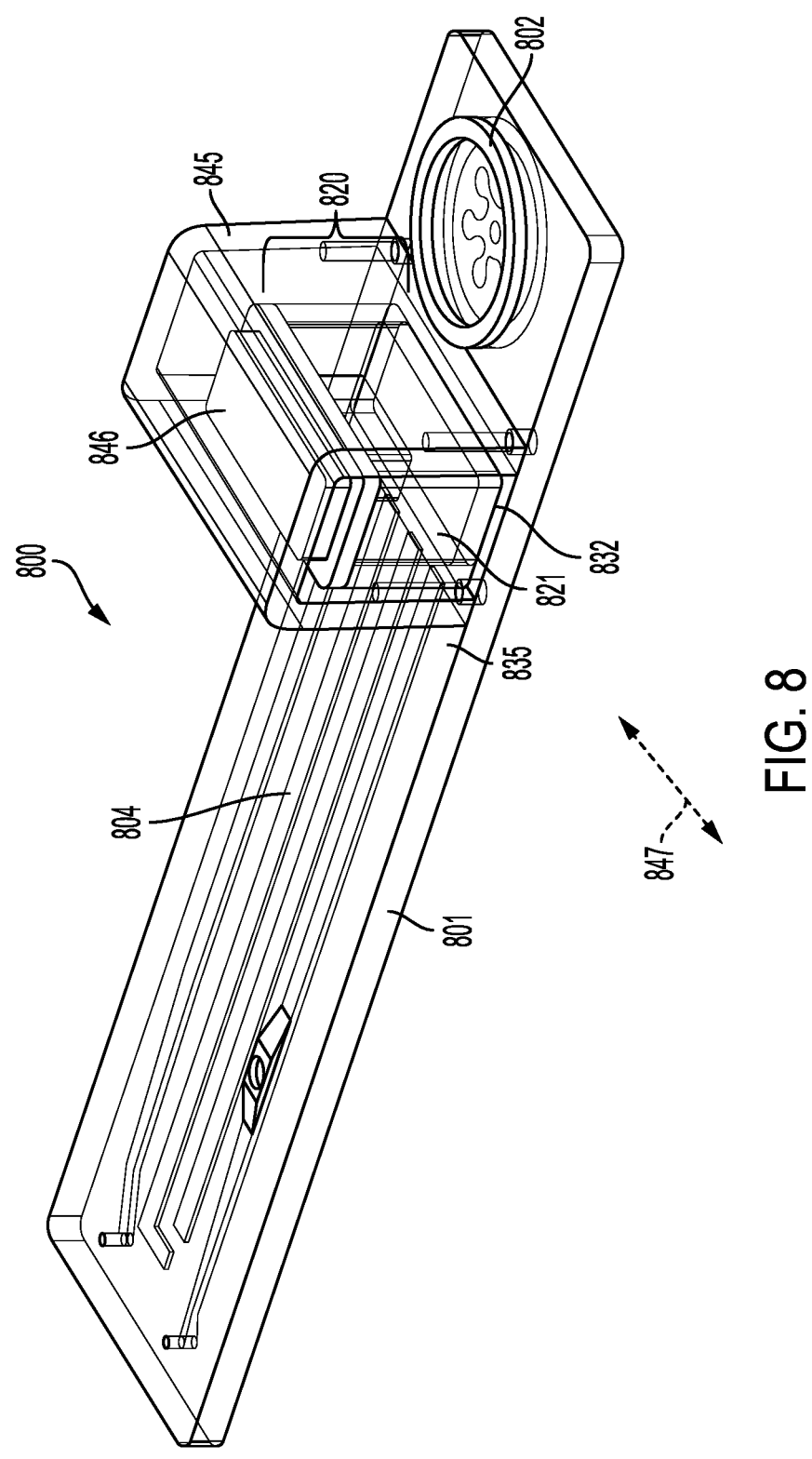
FIG. 8 is a perspective, partially transparent view of an eighth example implementation of a cartridge.
Figure 9:
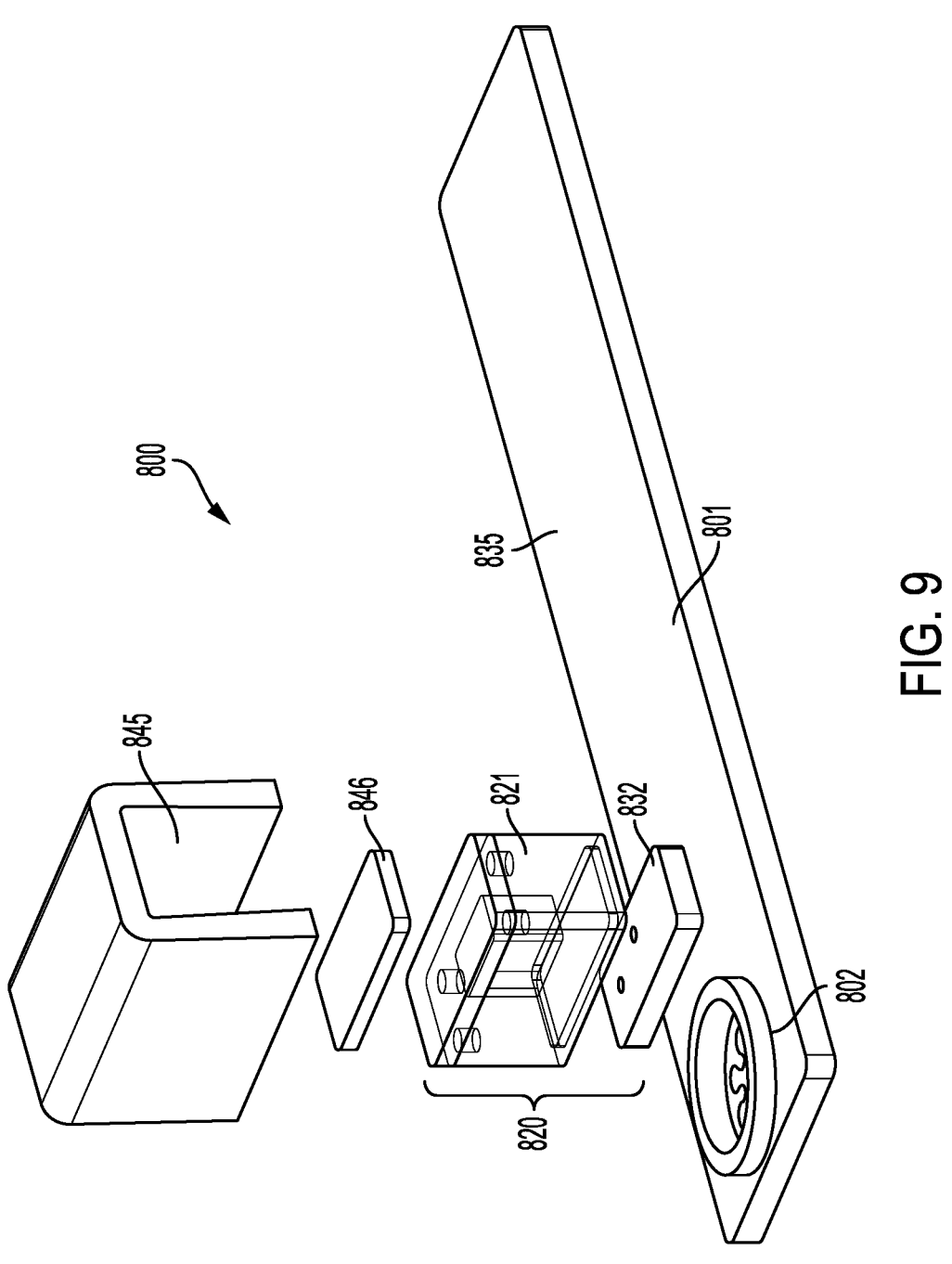
FIG. 9 is an exploded perspective view of the cartridge of FIG. 8.

Referring particularly to FIGS. 8 and 9, example cartridge 800 includes a base 801, structure 820, container 821, compression mechanism 846, and housing 845.

All or part of base 801 may be made of a clear material such as poly(methyl methacrylate), acrylic (PMMA) or the materials described above for the other example cartridges. Base 801 includes a reservoir 802. Reservoir 802 is a chamber for receiving a test sample, which may be a fluid such as whole blood, a blood-based fluid, a bodily fluid, or any other testable fluid. The test sample may be input manually from a vial into reservoir 802 or automatically using robotics, such as a robotic pipette that inputs the test sample into reservoir 802. In some implementations, reservoir 802 includes one or multiple membrane filters or one or more different types of plasma separation filters (not shown). These filters are used to separate plasma from whole blood. The plasma moves through filters and into a reaction channel of the cartridge as described below, leaving the other components of blood in the reservoir.

In some implementations, reservoir 802 may also include one or more reagents to be mixed with the test sample. The reagents may be pre-loaded into the cartridge at manufacture, for example. The reagents may be dry e.g., lyophilized or beaded, or liquid. In some cases, reagents may not be present in reservoir 802.

Figures 10A, 10B:
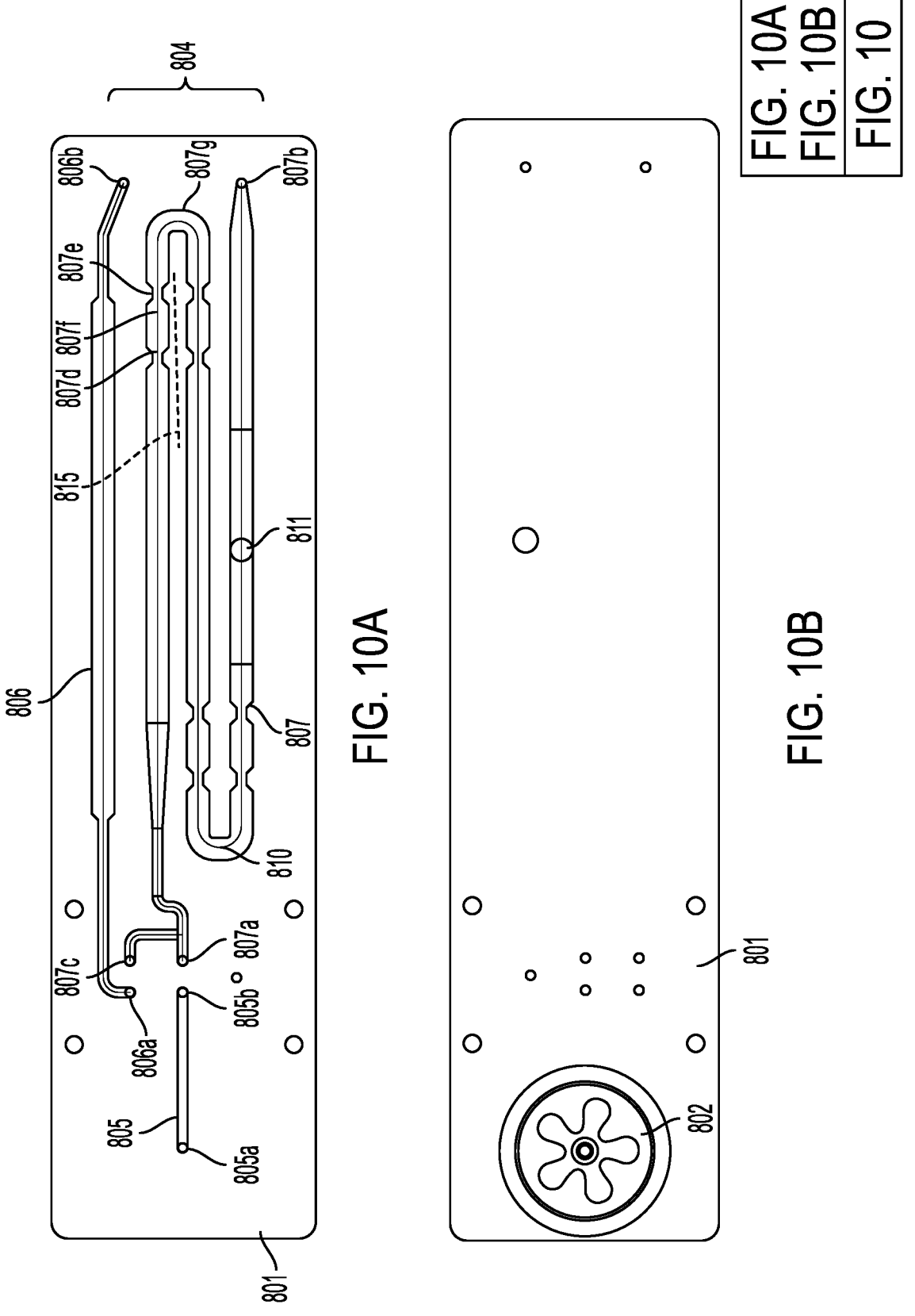
FIG. 10, comprised of FIGS. 10A and 10B, are cross-sectional and top views, respectively of example channels included in the cartridge of FIG. 8.

Referring also to FIG. 10, base 801 includes fluidic channels 804, including channels 805, 806, and 807 (FIG. 10A). For ease of description, channel 805 is called input channel 805, channel 807 is called reaction channel 807, and channel 806 is called waste channel 806. Channels 805, 806, and 807 can be controlled to be fluidically isolated from each other, and can be controlled to be selectably fluidically connectable as described below. Fluidic connection between channel 805 and 807 allows test sample to move from reservoir 802 to channel 807; and fluidic connection between channel 806 and 807 allows waste to be moved into channel 806.

Input channel 805 is linear in this example and includes an inlet 805a that fluidically connects to reservoir 802 and an outlet 805b that enables fluid connection to reaction channel 807. Waste channel 806 is substantially linear in this example and includes an inlet 806a that enables fluid connection to part of reaction channel 807. Waste channel 806 also includes a port 806b at an end thereof. Port 806b enables fluidic connection between waste channel 806 and a pressure control device, such as a vacuum pump which introduces negative pressure (suction) into the channel to move material into the channel. Reaction channel 807 is serpentine in shape in this example. Reaction channel 807 includes a first inlet 807a that is fluidically connectable to input channel 805. Reaction channel also includes a port 807b at an end thereof. Port 807b enables fluidic connection between reaction channel 807 and a pressure control device, such as a pump that provides positive and negative pressure (e.g., vacuum or suction) to reaction channel 807. Part of reaction channel 807 also includes a second outlet 807c that enables fluidic connection to waste channel 806.

In some examples, the same or different pressure control device may be connected to both ports 807b and 806b to implement the pressure changes in reaction channel 807 and waste channel 806. In some implementations, two pressure control devices may be isolated from each other and connect to each port 806b and 807b. The pressure control devices connected to the reaction channel 807 may be programmed or controlled to perform mixing by aspirating (e.g., using negative pressure to pull) the sample and reagent upstream toward the pressure control device along the reaction channel and by applying positive pressure to force the sample and reagent back downstream along the reaction channel away from the pressure control device. The positive and negative pressures can be applied alternately multiple times to allow the sample and the reagent to move within a selected segment of the channel 807 multiple times to produce a homogeneous mixture.

The serpentine shape may be advantageous in that it enables a longer channel, than other shapes, to be present on a cartridge with a limited size suitable for use with a testing device. The long channel may provide good opportunities for mixing the sample with reagent on the cartridge. However, different shaped channels may be used. For example, in some implementations, the reaction channel may be zigzagged or linear.

Optionally, reaction channel 807 can store one or more reagents at different regions. For example, one or more dry reagents of the type described above may be stored at region 810 of the reaction channel or at any other location. One or more dry reagents may also be stored at other regions of the reaction channel. The locations, if any, at which dry reagents are stored will depend on the testing to be performed using the cartridge. In some implementations, the dry reagents may be stored in the channel itself, rather than in a separate chamber or cavity along the channel. Reaction channel 807 also includes a testing area 811, where a mixture of sample and reagent is tested as part of a diagnostic testing process. The testing area is typically downstream of reagents in the reaction channel, if any reagents are present in the reaction channel.

Additionally or optionally, reaction channel 807 can include alternatively constricting and expanding geometries along its length. For example, as shown in FIG. 10A, parts 807d, 807e and parts 807f, 807g of reaction channel 807 have a same generally cylindrical shape, but parts 807d, 807e are narrower than parts 807f, 807g of reaction channel 807. As such parts 807d, 807e can hold a smaller volume of liquid than an equivalent length of parts 807f, 807g. In other words, taking parts 807d and 807f as examples, part 807d can hold a smaller volume of liquid than a portion of part 807f that has a length equivalent to a length of part 807d. The length of parts 807d and 807f may be measured along a path between inlet 807a and port 807b. For example, the lengths of parts 807d and 807f may be measured along axis 815. In some implementations, the larger and smaller volumed parts of reaction channel 807 may have different shapes—for example, parts 807d, 807e may be cylindrical and parts 807f, 807g may be cuboid. The constricting and expanding geometries along the length of reaction channel 807 create pressure gradients within reaction channel that may assist mixing that occurs in reaction channel, as described below.

Figure 27:
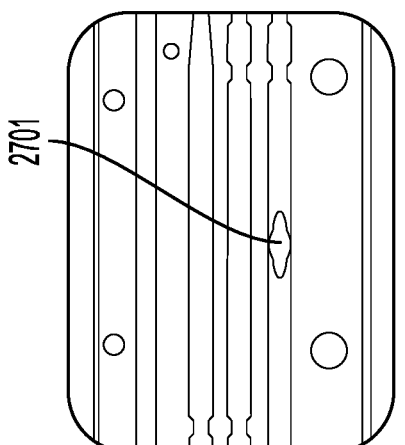
FIG. 27 is a top view of an example reaction chamber.

The testing area 811 may be or include a reaction chamber. The reaction chamber may have an elliptical cross-section shape having a broad center and tapered ends. An example of such a reaction chamber 2701 is shown in FIG. 27. In other examples, the reaction chamber may have a different cross-section shape than the cross-section shape of the channels 806, 807, such as a circular or rectangular cross-sectional shape.

An assay chemistry reaction starts and continues when the test sample and the reagent start to contact each other and continues to be mixed. The homogeneously mixed test sample and reagent can be a mixture of materials from which neither the unmixed test sample nor the unmixed reagent can be identified. For example, (a) in an anti-factor Xa colorimetric assays, free Xa enzymes react with chromogenic substrate to enable quantification of unfractionated heparin (UFH), and (b) in a sample containing D-Dimer mixed with latex reagent its reaction buffer causes agglutination with turbidity changes depending on the quantity of D-Dimer.

Referring back to FIGS. 8 and 9, cartridge 800 also includes movable structure 820. Structure 820 fits atop base 801 and is configured for movement along the directions of arrows 847 (FIG. 9) like movable structure 310 of FIG. 3. As described below, the structure is movable to create fluidic paths across channels on base 801.

In this example, structure 820 includes a seal 832, a container 821, and a compression mechanism 846, all of which are movable within stationary housing 845.

Figure 26:
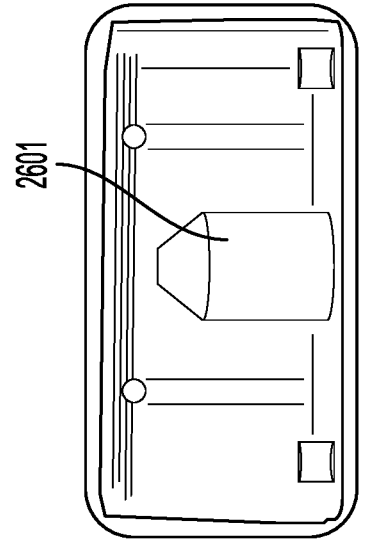
FIG. 26 is a side view of another example chamber for holding liquid.
Figure 25:
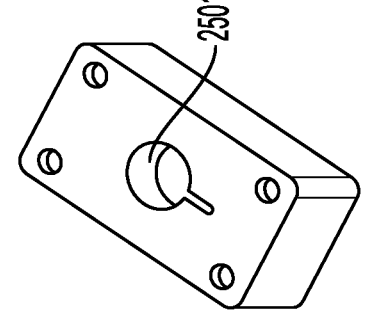
FIG. 25 is a bottom perspective view of an example chamber for holding liquid.

Container 821 includes a chamber to hold a liquid, such as one or more liquid reagents or a reaction buffer. The container may also hold a dry (or "solid") reagent. The container may be made of polyethylene terephthalate glycol (PETG) or HDPE in some implementations The internal volume of chamber is designed based on volume requirements of the reagents to be used in the assay performed on the cartridge. The chamber may include more liquid (e.g., reagent) than is required for a particular assay. Top, bottom, and perspective views of container 821 are shown, respectively, in FIGS. 11A, 11B, and 11C. FIGS. 11A and 11C, show container 821 having chamber 828, and as shown in FIGS. 11A and 11B, container 821 includes a container outlet 830 of the type described above, through which fluid is output from the chamber to a channel on the cartridge. A vent port 831 is also included to vent air from the chamber. The top of chamber 828 may be sealed using a plastic cover or film, for example. In the example of FIG. 11, chamber 828 is a rectangular cuboid in shape. In other examples, chamber 828 may have a different shape. For example, chamber may have the cylindrical shape 2501 of FIG. 25 or the combination cylindrical and pyramidal shape 2601 of FIG. 26.

As shown in FIGS. 9 and 10, structure 820 also includes example seal 832. Seal 832 may be made of silicone or of any of the other materials described with respect to FIGS. 2 to 6 that enables formation of a fluid-tight connection between the seal and a top surface 835 of base 801. Top, bottom, and perspective views of seal 832 are shown, respectively, in FIGS. 12A, 12B, and 12C. As shown in FIGS. 12B and 12C, seal 832 includes two channels 836 and 837, which are formed by notches or indentations in the bottom of seal 832 that do not go all the way through the seal. The channels 836 and 837 form fluidic connections on the cartridge, as described below.

Seal 832 also includes a duct 840 that, when seal 832 and container 821 are mated to form structure 820, as shown in FIGS. 8 and 9, container outlet 830 and duct 840 align to create a fluid communication path from chamber 828. Also, duct 840 is arranged on seal 832 so that, when structure 820 is placed on base 801, duct 840 is alignable to the inlet 807a of reaction channel 807. Seal 832 also includes a vent duct 841 that aligns to duct 831 to equalize pressure within the container to the exterior pressure and thereby facilitate output of content from the container. In some implementations, seal 832 contains a membrane over duct 840. The membrane peels away in response to lateral movement, thereby creating a fluidic path from chamber 828 through container outlet 830, duct 840, and into a channel.

Figures 13A, 13B:
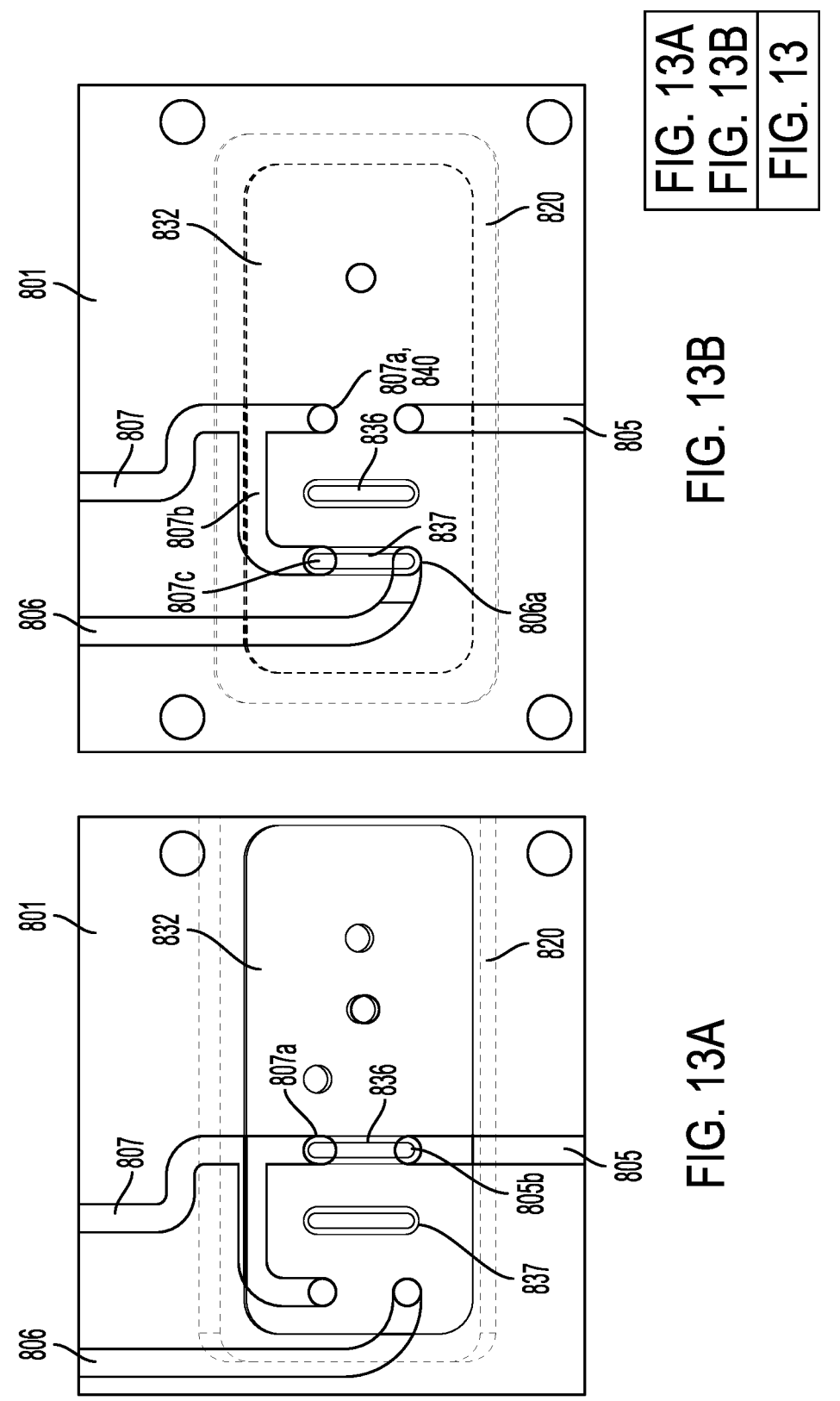
FIG. 13, comprised of FIGS. 13A and 13B, show bottom views of an example movable structure having slider valve functionality at different positions on a based of the cartridge of FIG. 8.

FIG. 13 shows a front view of seal 832 (as part of structure 820) placed at different locations on base 801. Referring to FIGS. 12 and 13A, channel 836 of seal 832 has a sufficient length to span the distance between outlet 805b of input channel 805 and inlet 807a of reaction channel 807, thereby fluidically connecting input channel 805 and reaction channel 807. Referring to FIGS. 12 and 13B, channel 837 of seal 832 has a sufficient length to span the distance between outlet 807c of part of reaction channel 807 and inlet 806a of waste channel 806, thereby fluidically connecting waste channel 806 and part of reaction channel 807. Furthermore, in the location of structure 820 shown in FIG. 13B, duct 840 aligns to the inlet 807a of reaction channel 807, thereby creating a fluidic connection between the interior of chamber 828 of container 821 and reaction channel 807 to enable the content of chamber 828 to be suctioned into reaction channel 807.

Channel 837 connects to the waste channel 806 enabling suctioning of residual/extra liquid from container 821 to prevent that liquid from reaching the reaction channel. The sample flow side channel 807b (FIG. 13B) may limit air bubble formation in the rest of reaction channel 807. More specifically, during suctioning of a test sample (e.g., to separate plasma from other blood components) there is a potential for air bubble formation in reaction channel 807. Channel 807b is another path for test sample to flow, however minimally. This occurs by capillary action when operation of pressure control device 2206a is terminated. Upon re-activation of pressure control device 2206a, to complete suctioning of test sample for metering, air being suctioned into reaction channel 807 can be mitigated due to the plasma in channel 807b.

In some implementations, a separate channel, which is different from channels 837 and 836 in seal 832, may connect ports 806a and 807c. In this example, seal 832 may not include channel 837.

Cartridge 800 also includes a compression mechanism 846 similar to that described with respect to FIGS. 1, 3, 4, and 5, for example, for pushing structure 820 downward against base 801, while still allowing movement of structure 820 across the surface 835 of base 801 in one or both of the directions of arrows 847. In some implementations, this movement is substantially perpendicular to the direction of force applied by the compression mechanism 846. The compression mechanism may be an HDPE spacer or spring, although spacers or springs made other plastics or metal may be used.

Housing 845 is similar to the housings described herein to enclose structure 820 at least partly, while allowing actuator access. Housing 845 may be made of aluminum or high-density polyethylene (HDPE) in some implementations, similar to the housings described with respect to FIGS. 2 to 6 above. Housing 845 may be attached to base 801 through screws, snap-fit, or plastic welding, for example.

Cartridge 800 can be used with one or more actuators, such as linear actuators. The actuators may be controlled by a control system to contact structure 820 and to move structure 820 across the surface of base 801 in one or both of the directions of arrows 847 (FIG. 8). Use of silicone in the seal 832 enables movement of structure 820 in the presence of compression.

Figure 23B:
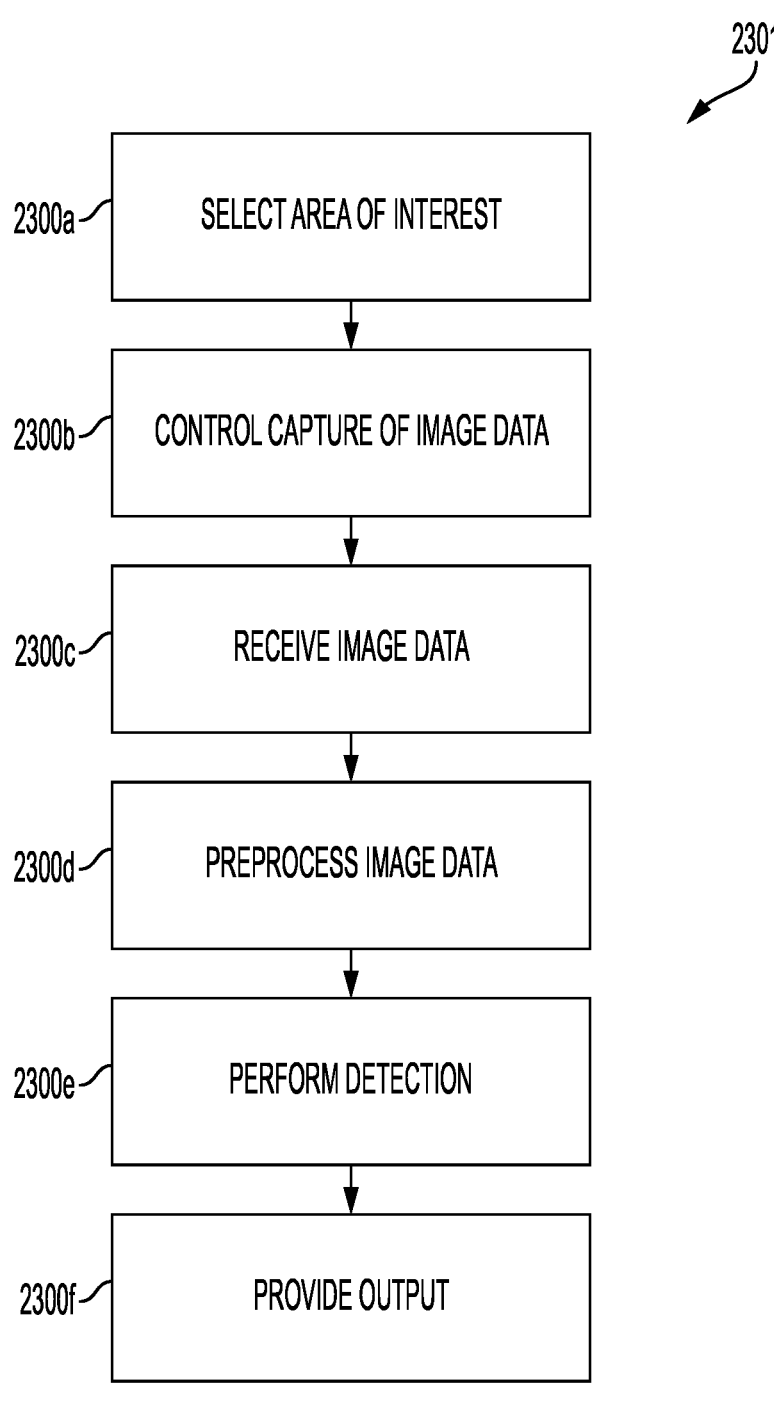
FIG. 23B is a flowchart containing example operations included in an example process for detecting an anomaly in a fluid flow.
Figure 24:
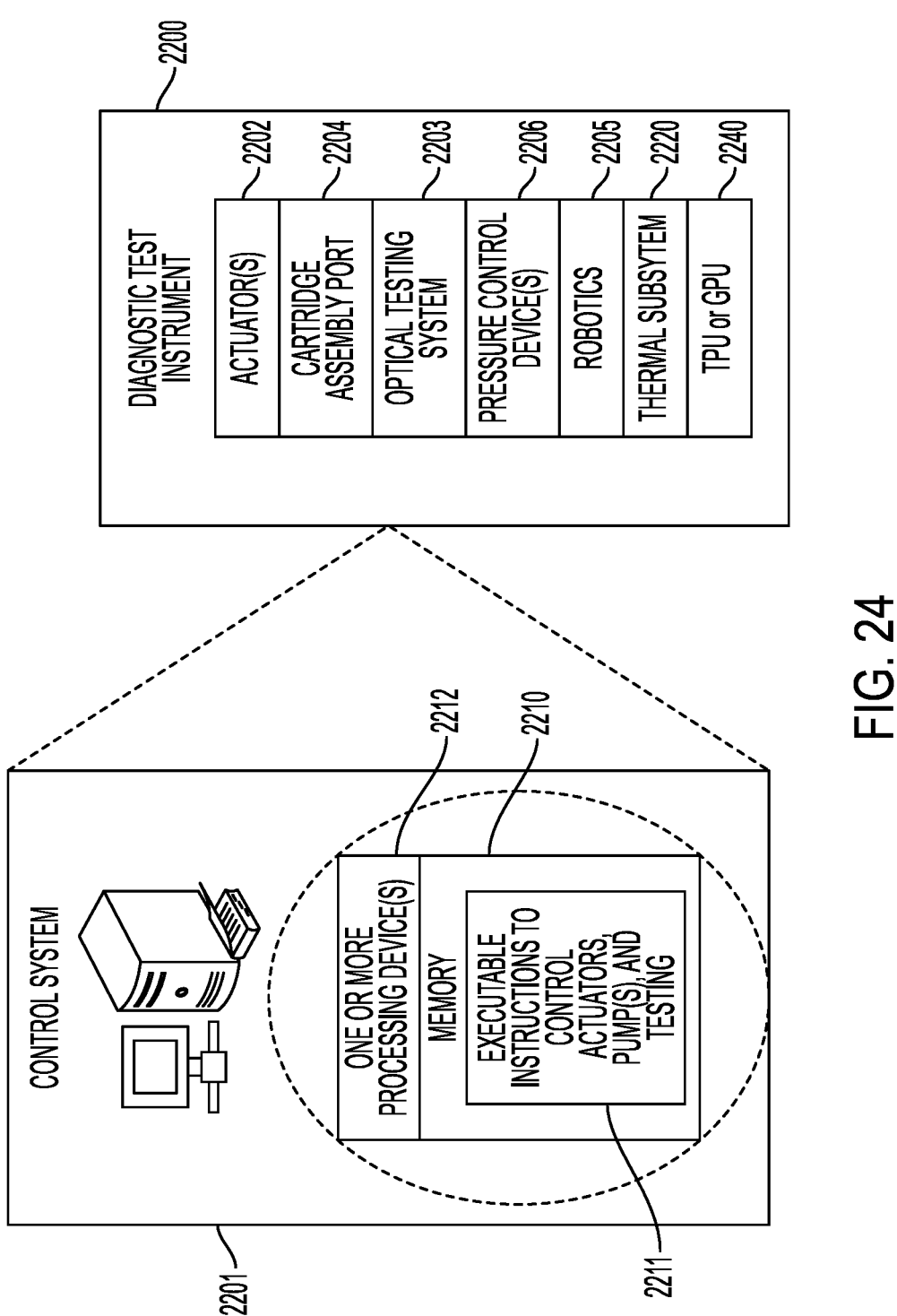
FIG. 24 is a block diagram of an example diagnostic testing instrument.

FIG. 24 is a block diagram of example diagnostic test instrument 2200 on which testing, such as multi-stage testing, using a cartridge, such as cartridge 800, may be performed. Diagnostic test instrument 2200 includes a control system 2201, one or more actuators 2202 of the type described herein, an optical testing system 2203, an input port 2204 for receiving cartridge 800, optional robotics 2205 such as a robotic pipette for providing test sample, and one or more pressure control devices 2206 of the type described herein. Control system 2201 includes machine-readable memory 2210 storing instructions 2211 that are executable by one or more processing devices 2212 to control movement of actuator(s) 2202 as described herein, to control the operation of pressure control devices 2206 as described herein, to control the robotics 2205, and to control testing via optical testing system 2203 based on a mixture of sample and reagent in the cartridge. In particular, the control system executes instructions to perform all or part of the operations included in processes 2000 of FIG. 20, 2101 of FIG. 21B, 2220 of FIG. 22, and 2301 of FIG. 23B. Diagnostic test instrument 2200 may also include a thermal subsystem 2220. The thermal subsystem may be controlled by control system and may be used to monitor the temperature of the cartridge and to heat the cartridge if needed for a particular test. For example, the cartridge may be heated to 37° Celsius for some testing. Although FIG. 24 shows the control system as internal to the diagnostic test instrument, all or part of the control system may be external to the diagnostic test instrument. For example, all or part of the control system may be implemented on a computing system that is external to the diagnostic test instrument.

Examples of diagnostic test instruments in which the cartridges described herein may be used include, but are not limited to, the GEM Hemochron® 100 instrument from Werfen® S.A., the Cobas® analyzer from Siemens® A.G., and the i-STAT® instrument from Abbott Laboratories®.

Figure 14:
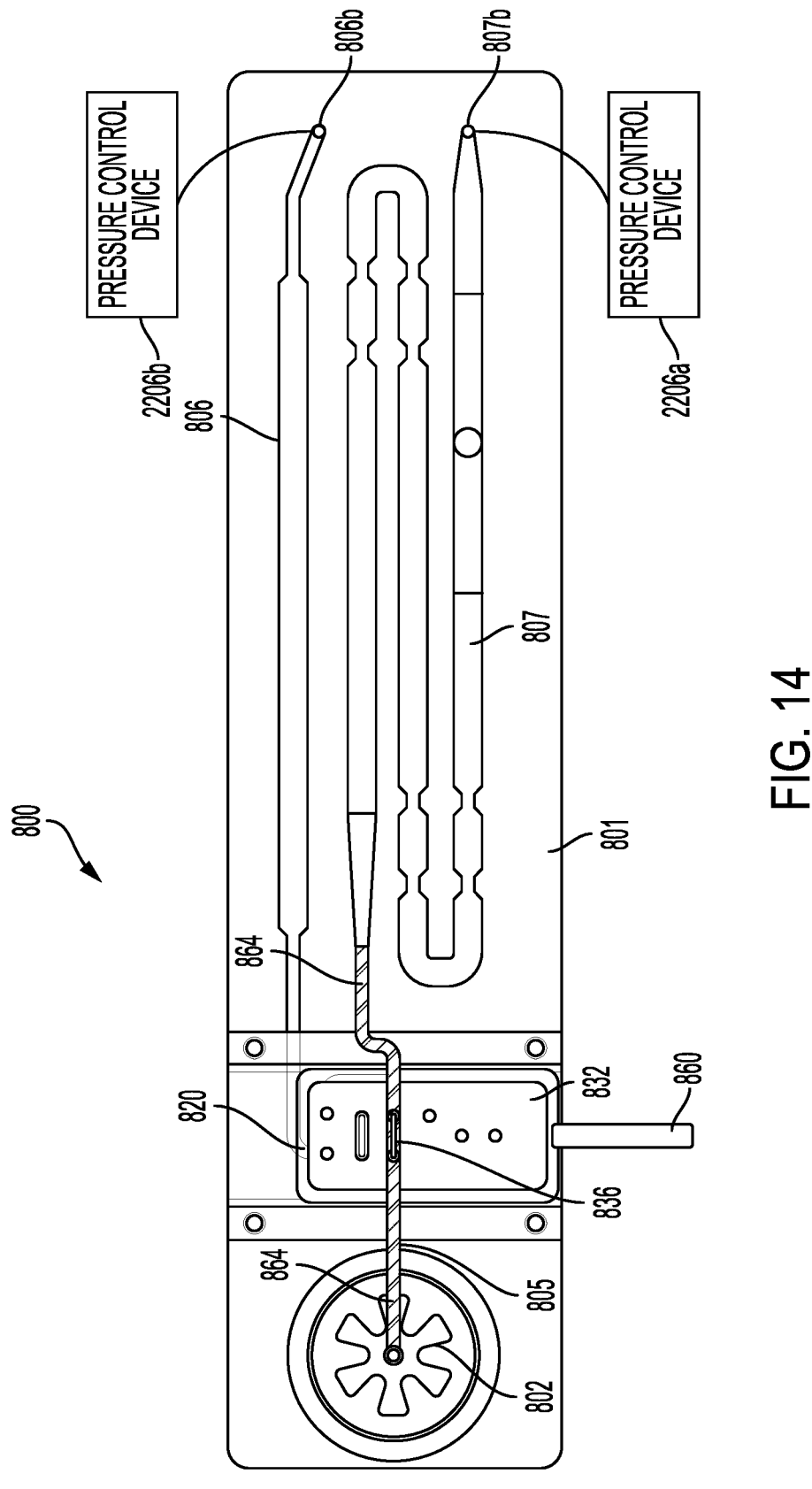
FIGS. 14, 15, 16, 17, 18, and 19 show top views of the cartridge of FIG. 8 at different times during an example multi-stage diagnostic testing process.
Figure 20:
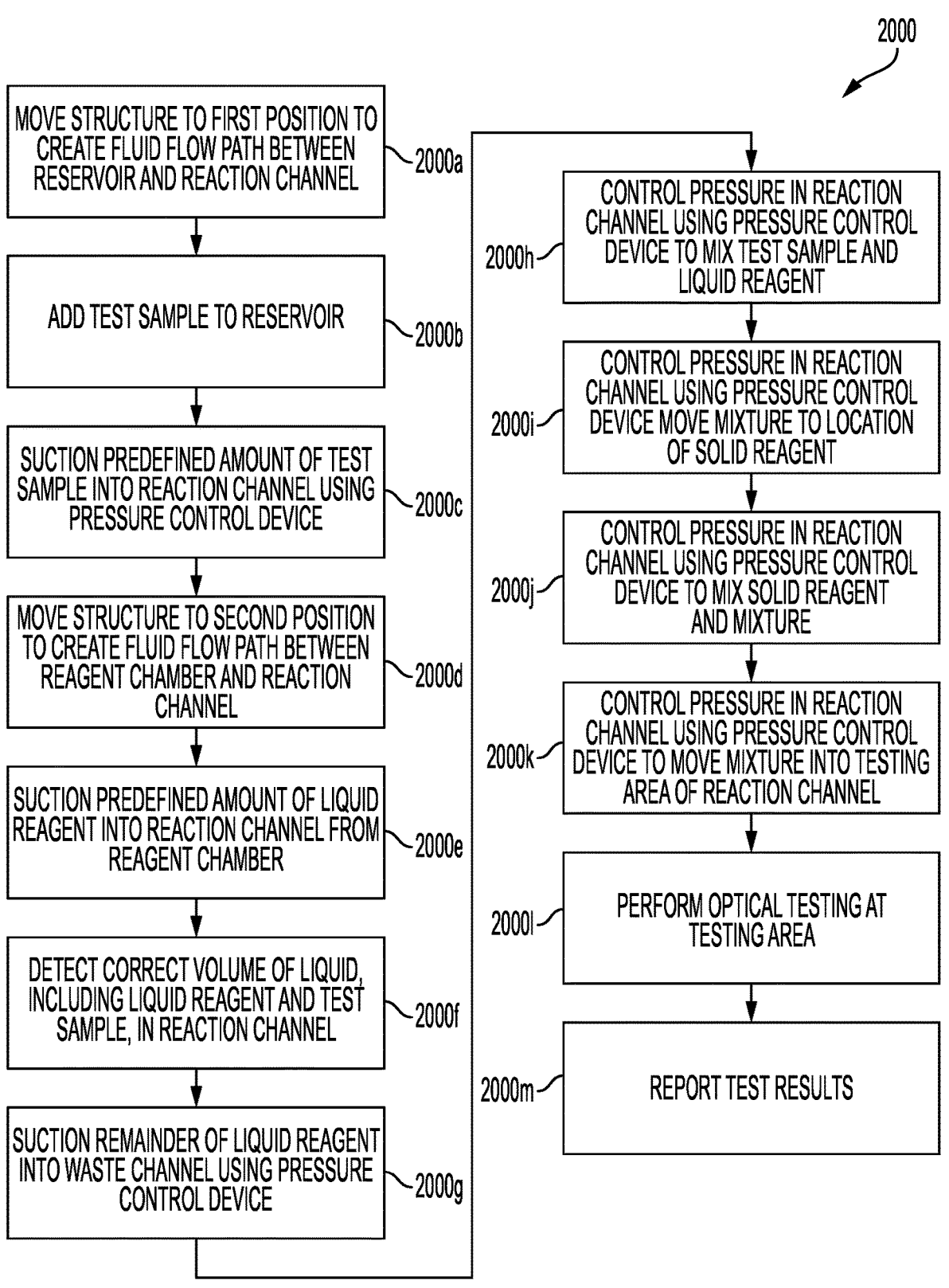
FIG. 20 is a flowchart containing example operations included in an example multi-stage diagnostic testing process performed using the cartridge of FIG. 8.

FIG. 20 shows operations included in example testing process 2000 that may be performed using a cartridge such as cartridge 800. Referring also to FIG. 14, process 2000 includes moving (2000a) structure 820 to the location shown in FIG. 14. For example the control system 2201 may control actuator 860 to move the structure to that location. Alternatively, structure may be loaded into that location in the cartridge prior to testing and no movement may be needed. In the location shown in FIG. 14, channel 836 on seal 832 of structure 820 is aligned to the outlet of input channel 805 and to the inlet of reaction channel 807 to fluidically connect input channel 805 to reaction channel 807. This alignment is described above with respect to FIG. 13A and defines a fluidic duct between input channel 805 and reaction channel 807.

Process 2000 includes adding (2000b) a test sample to reservoir 802. For example, the control system may control a robotic pipette to provide the test sample to reservoir 802. In an example, the test sample may be whole blood, and multiple (e.g., two) membrane filters or plasma separation filters in reservoir 802 may separate plasma from the whole blood within reservoir 802. The plasma may be the liquid that is moved into the channels of the cartridge for testing. Alternatively, whole blood, or other types of processed whole blood such as serum, blood derivatives or pre-mixtures of blood and one or more reagents, can be the sample or samples that is/are moved into the channel of cartridge 800 for testing.

The control system 2201 may then control a pressure control device 2206a (which may be one of pressure control devices 2206) connected to port 807b of the reaction channel to apply negative pressure—for example, suction or vacuum pressure—to reaction channel 807. This negative pressure suctions (2000*c*) sample 864 such as plasma from reservoir 802, through input channel 805, through the duct formed by channel 836 in seal 832 and into reaction channel 807.

The pressure control device 2206*a* continues to apply the negative pressure until the amount of the sample reaches a predefined amount needed for an assay that is implemented as part of the testing process. This predefined amount of test sample may be programmed into the control system. For example, the predefined amount may be based on the amount of time that the negative suction is applied and the flow rate, e.g., based on the dimension of the channels and the amount of pressure applied. After the predefined amount of test sample has entered reaction channel 807, the control system 2201 controls actuator 860 to move (2000*d*) structure 820 from the location shown in FIG. 14 to the location shown in FIG. 15.

Figure 15:
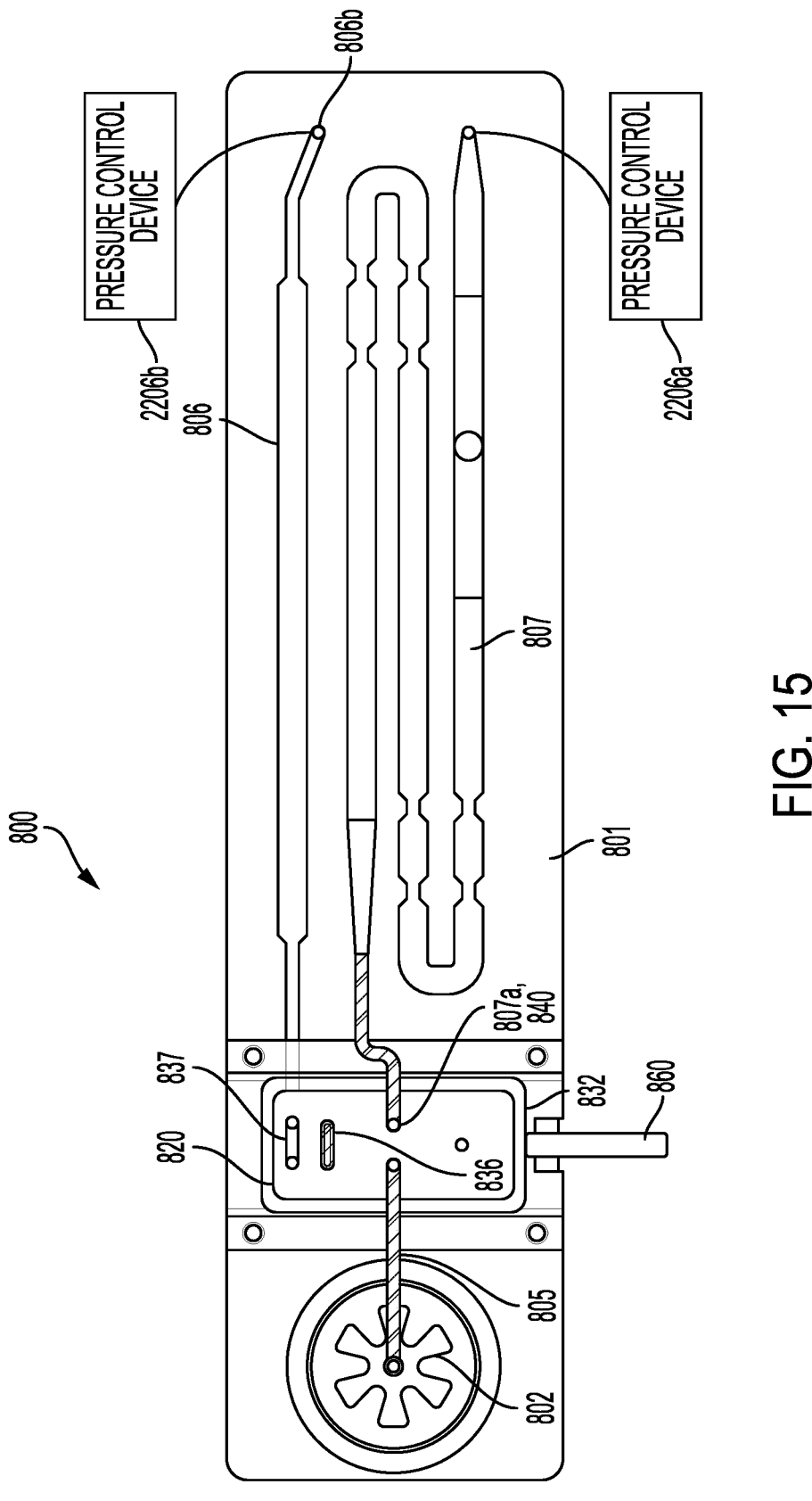

As shown FIG. 15, structure 820 is moved so that channel 836 on seal 832 is unaligned. In this configuration, as shown in FIG. 13B, channel 837 on seal 832 is aligned to the inlet 806*a* of waste channel 806 and to an outlet 807*c* of reaction channel side channel 807*b* to fluidically connect waste channel 806 to reaction channel 807 to enable removal of unused content from the container, as described below with respect to FIG. 17. This alignment creates a fluidic path between reaction channel 807 and waste channel 806. In the configuration shown in FIG. 15, the container outlet 831/ duct 840 of structure 820 aligns to the inlet 807*a* of reaction channel 807. This alignment is described above with respect to FIG. 13B and creates a fluidic connection between chamber 828 in the container containing liquid, the container outlet, the inlet to reaction channel 807, and the reaction channel itself.

Figure 16:
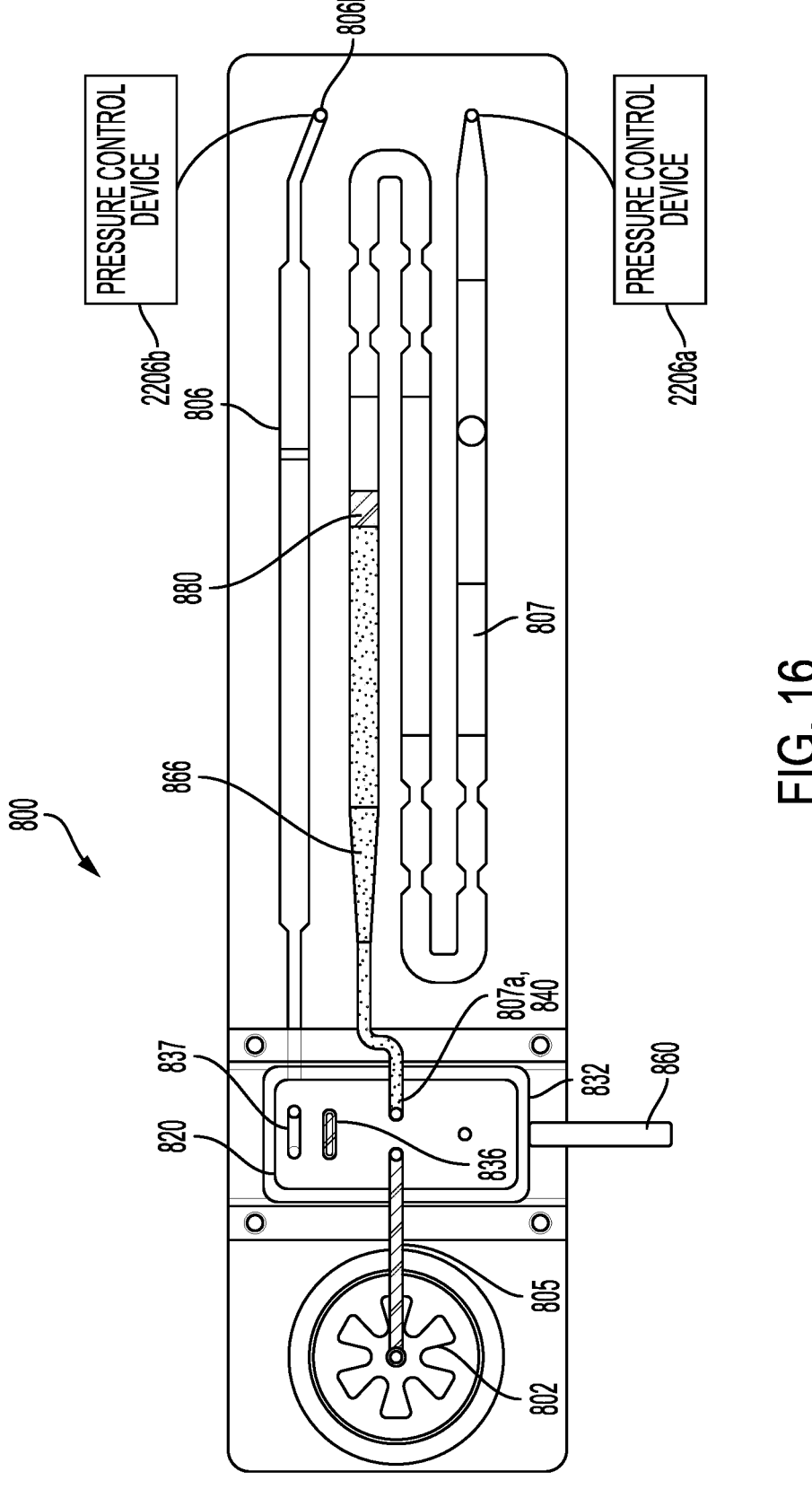

Next, as shown in FIG. 16, the control system controls pressure control device 2206*a* to apply negative pressure to reaction channel 807. This negative pressure suctions (2000*e*) a predefined amount of liquid (e.g., reagent) 866 from chamber 828 through the container outlet, through the inlet of reaction channel 807, and into reaction channel 807. The amount of sample and reagent in the channel may be determined using an edge detection process, an example of which is described below with respect to FIG. 21, or the amount of sample and reagent may be based on the amount of time that the negative suction is applied. The amount of sample and reagent in the channel may be also determined by monitoring pixel properties of images or optical data from the channel and comparing those properties to one or more thresholds, and/or performing machine learning-based edge detection and tracking over time. Combinations of one or more of these techniques may also be used.

After the sample and reagent have entered reaction channel 807, the control system 2201 stops operation of pressure control device 2206*a* thereby stopping entry of additional liquid in to the reaction channel.

The control system detects (2000*f*) that the correct volume of liquid 866, such as the combination of test sample and optional liquid reagent from container 821, is in reaction channel 807 for an assay. This correct volume may be determined using edge detection in accordance with process 2220 of FIG. 22, for example. Next, the control system controls pressure control device 2206*b* to suction (2000*g*) any unneeded remaining of the liquid from chamber 828 and into waste channel 806 via the fluidic path created along elements 807*a*, 807*c*, and 837 (FIG. 13*b*). Pressure control devices 2206*a* is controlled to provide suction in the reaction channel 807 while pressure control device 2206*b* is controlled to provide suction in the waste channel 806. When pressure control device 2206*a* is terminated at 807*b*, the channel 807 is blocked off by a plunger within a syringe barrel of the pressure control device. This creates a strong resistance against suction from the pressure control device 2206*b* at port 806*a*. Hence, when pressure control device 2206*b* at port 806*b* is activated for suction, the pressure control device 2206*b* suctions the liquid from the reagent reservoir and not from reaction channel 807.

Figure 17:
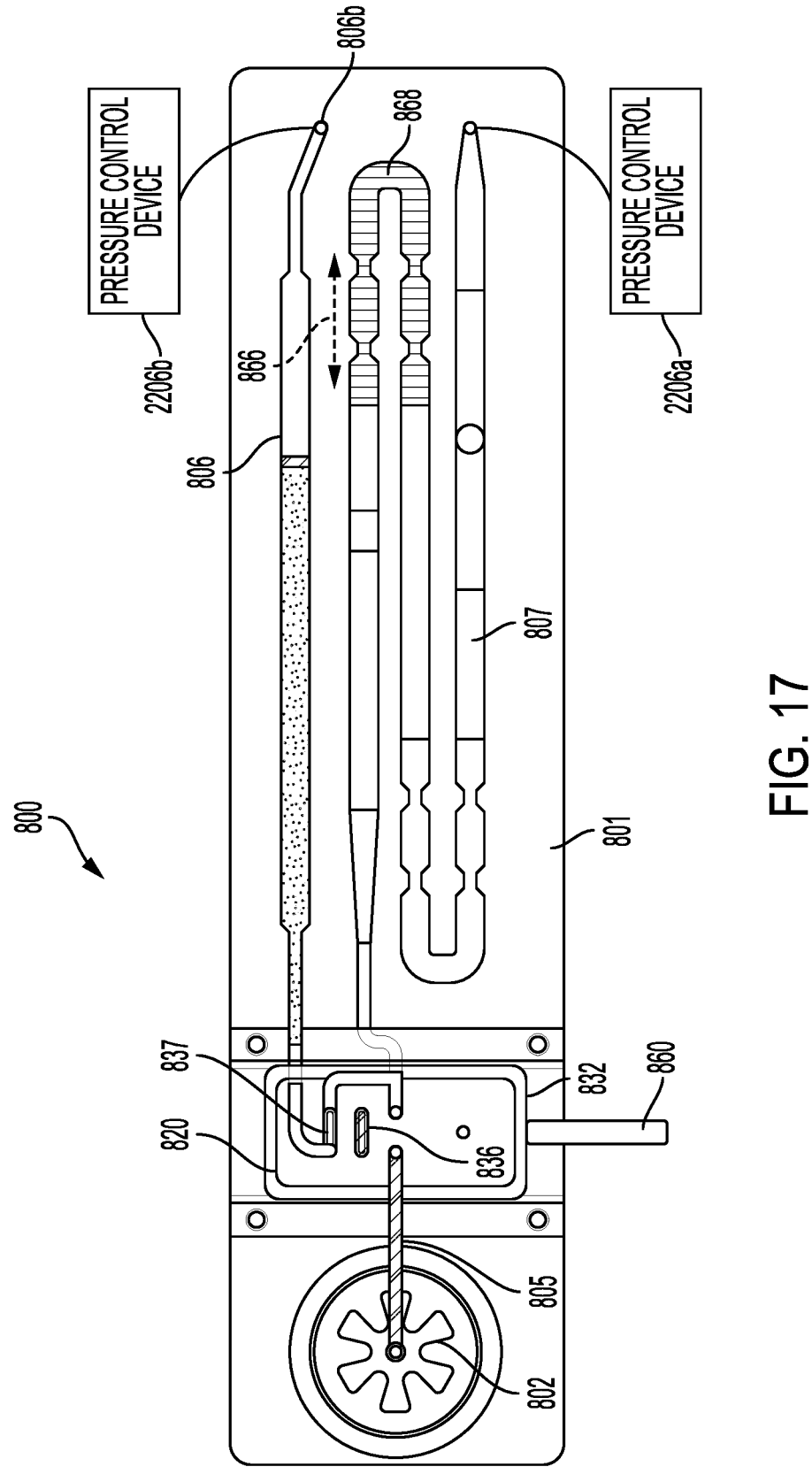

Assuming that reaction channel contains the correct volume of liquid (for example the correct volume of both test sample and, if needed, liquid reagent), as shown in FIG. 17, the control system controls pressure control device 2206*a* to alternately apply negative and positive pressure to reaction channel 807*b* to move (2000*h*) the combination 868 of test sample and optional liquid reagent back-and-forth in the reaction channel in the directions of arrow 866. This oscillatory motion mixes the test sample and liquid within the reaction channel to produce a homogeneous mixture. For example, the sample and liquid may be mixed in the serpentine portion of the reaction channel The pressure needed to perform the mixing and the number of times that the combination of test sample and liquid moves back-and-forth may be programmed into the control system in some implementations and may be based, for example, on the types of reagents and sample used. The expanding and contracting geometries of reaction channel 807 creates pressure gradients in reaction channel that aid in the mixing, as noted previously.

Figure 18:
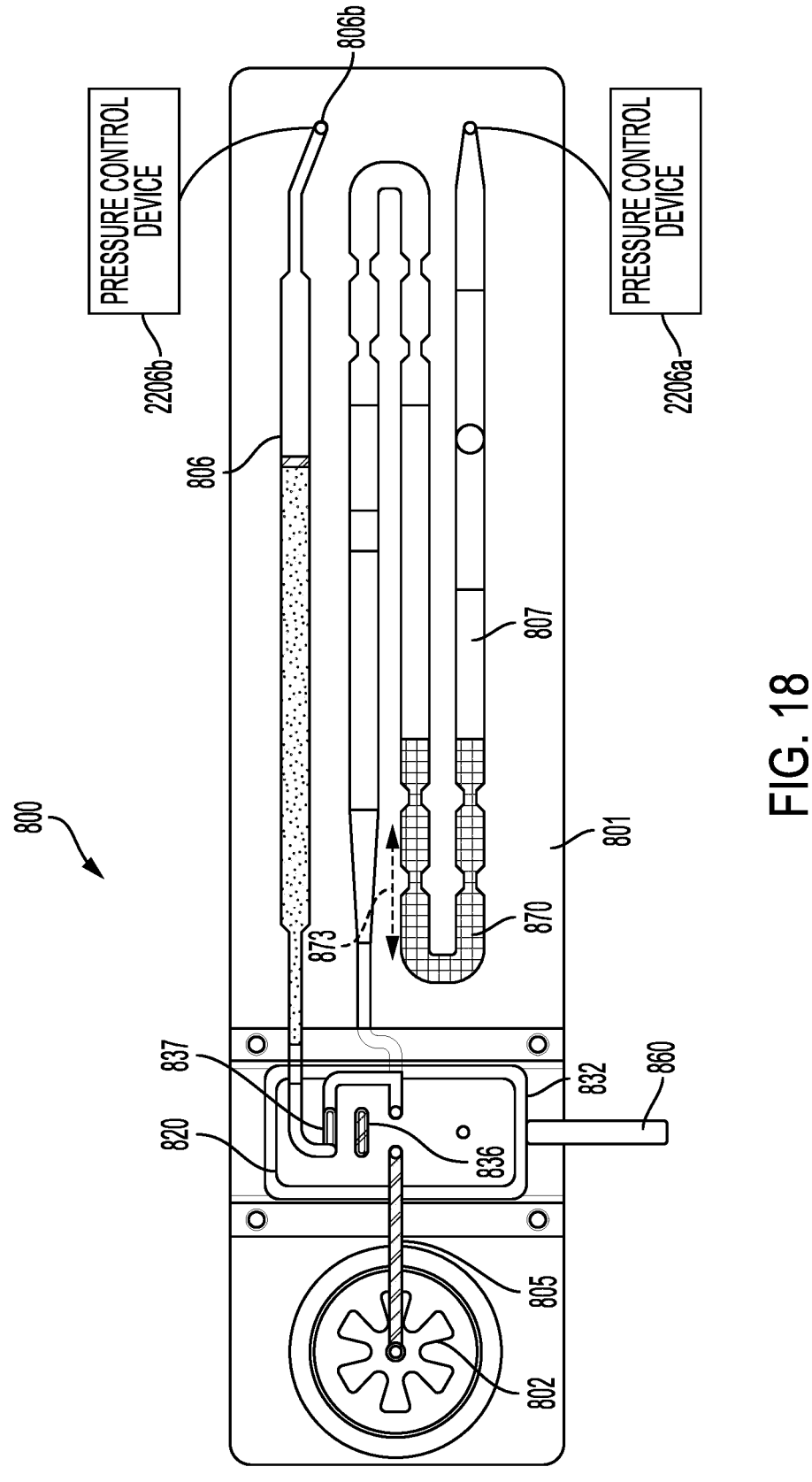

After mixing the liquids, as shown in FIG. 18, the control system controls pressure control device 2206*a* to apply negative pressure to move (2000*i*) the resulting liquid mixture to a location 870 where one or more dry reagents are located in reaction channel 807. The location or locations of dry reagents in the reaction channel will depend on the type of testing being performed using the cartridge and how easy it is to dissolve the dry reagents, for example. Control system controls (2000*j*) pressure control device 2206*a* to alternately apply negative and positive pressure to reaction channel 807 to move the liquid mixture and the dry reagent back-and-forth in the reaction channel in the directions of arrow 873 around location 870. This oscillatory motion causes the dry reagent to dissolve within the liquid mixture, thereby mixing the two into a homogeneous mixture. The pressure needed to perform the mixing and the number of times that the combination of test sample and liquid moves back-and-forth may be programmed into the control system in some implementations and may be based, for example, on the types of reagents and sample used. The expanding and contracting geometries of reaction channel 807 creates pressure gradients in reaction channel that aid in the mixing, as above.

In implementations where there is dry reagent at more than one location within reaction channel 807, operations 2000*i* and 2000*j* may, or may not, be repeated for each location. The dry reagents at different locations may be the same or may be different reagents. In some implementations, there may be no dry reagents in the reaction channel and, as such, operations 2000 and 2000*j* may be omitted.

The amount of mixing that is performed may be based on the testing to be performed. For example, 10 to 30 (e.g., 20) mixing cycles (e.g., back and forth) may be performed for D-Dimer dried latex mixing. For an anti-factor Xa assay, mixing with a substrate using 10 to 30 (e.g., 20) cycles at a first part of the serpentine channel is performed followed by mixing a dried enzyme using 2 to 10 (e.g., 5) cycles in a second, downstream part of the serpentine channel.

Figure 19:
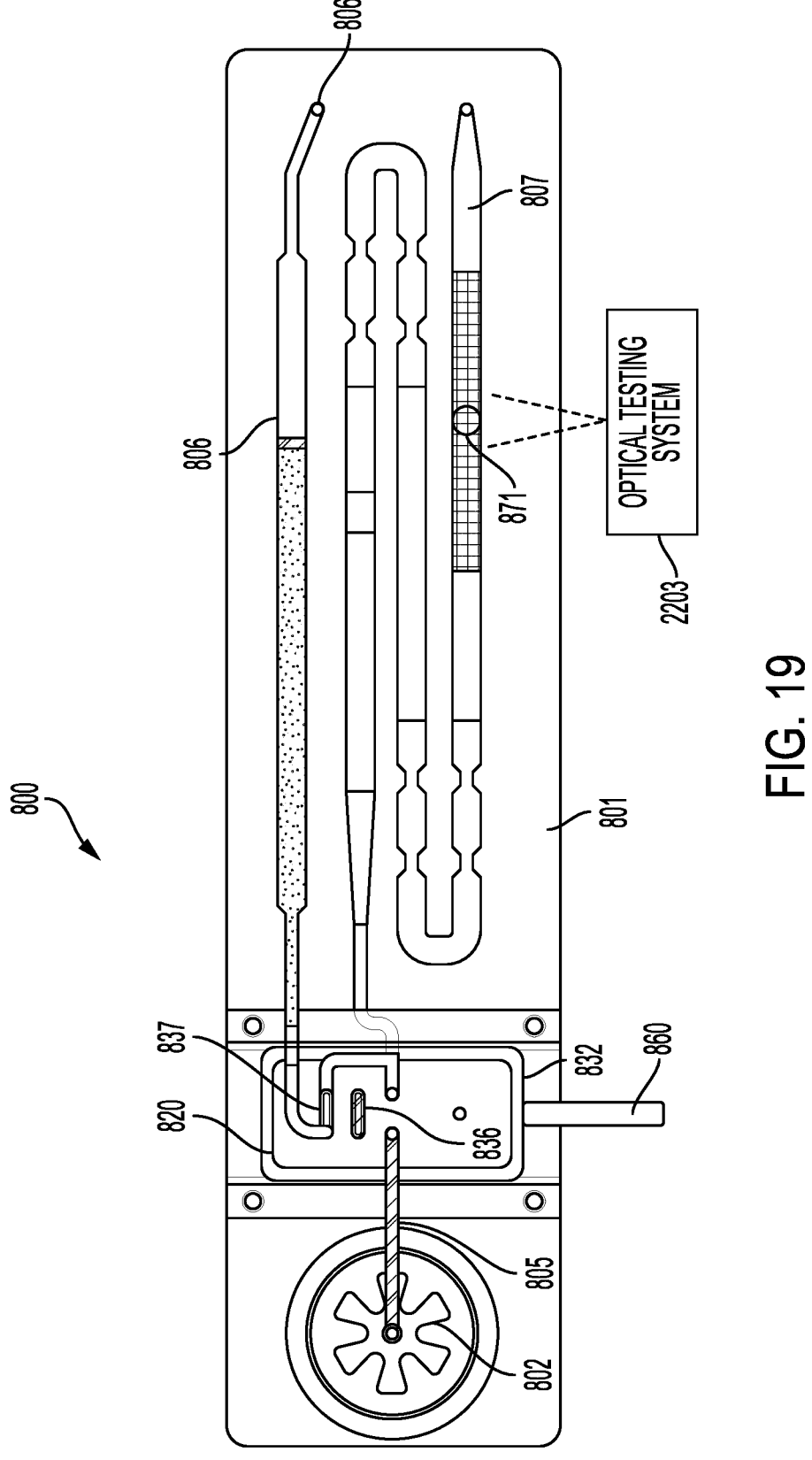

Following mixture of all dry reagents with liquids in the reaction channel, as shown in FIG. 19, control system controls pressure control device 2206a to apply negative pressure to move (2000k) the resulting liquid mixture to testing location 871 in reaction channel 807. The negative pressure is downstream of the liquid mixture such that the mixture can move in a desired direction. In implementations where pressure is applied upstream of the liquid mixture movement direction, then the pressure should be positive pressure. At testing location 871, optical testing system 2203 performs optical testing (2000l) on the liquid mixture. For example, reactions in the liquid mixture may be monitored using optical detection techniques, such as absorbance measurement, scattering measurement, or fluorescence signal measurement. Physical parameters that may be measured include, but are not limited to, optical absorbance, optical fluorescence, colors, a degree of agglutination for D-Dimer, intensity of colorimetry for anti-Xa, and fibrin clot formation. The control system may report the test results (2000m) to a computing systems as data or display the results on a user interface of the diagnostic test instrument as text and/or graphics.

In some implementations, cartridge 800 may be disposable. Accordingly, following testing as described above, the cartridge may be discarded.

Referring back to FIG. 1, channel 102 may have the same structure, function, and content as reaction channel 807 described with respect to FIGS. 8 to 20 or variations thereof described herein, may connect to a pressure control device 2206a to move test sample and/or reagent through channel 102 in the manner described in operations 2000h to 2000K above, and may have an optical testing system 2203 positioned relative to channel 102 to perform tests on a mixture of test sample and reagent as described with respect to operations 2000l and 2000m above. In this example of FIG. 1, the test sample and/or optional liquid reagent may enter channel 102 via I/O 107 and I/O 104. Alternatively, the test sample may enter channel 102 through a fluidic connection that is not shown in FIG. 1 or the test sample may be deposited manually or automatically into channel 102.

Referring back to FIG. 2, channel 202 may have the same structure, function, and content as reaction channel 807 described with respect to FIGS. 8 to 20 or variations thereof described herein, may connect to a pressure control device 2206a to move test sample and/or reagent through channel 202 in the manner described in operations 2000h to 2000K above, and may have an optical testing system 2203 positioned relative to channel 202 to perform tests on a mixture of test sample and reagent as described with respect to operations 2000l and 2000m above. In this example of FIG. 2, a liquid such as test sample and/or reagent enters channel 202 from chamber 235. For example, the test sample and/or reagent may be added to chamber 235 via one or more inlets (not shown). Alternatively, reagent only enters channel 202 from chamber 235 and test sample enters channel 202 through a fluidic connection that is not shown in FIG. 2 or the test sample may be deposited manually or automatically into channel 202.

Referring back to FIG. 3, channel 302 may have the same structure, function, and content as reaction channel 807 described with respect to FIGS. 8 to 20 or variations thereof described herein, may connect to a pressure control device 2206a to move test sample and/or reagent through channel 302 in the manner described in operations 2000h to 2000K above, and may have an optical testing system 2203 positioned relative to channel 302 to perform tests on a mixture of test sample and reagent as described with respect to operations 2000l and 2000m above. In this example of FIG. 3, a liquid such as test sample and/or reagent enters channel 302 from chamber 335. For example, the test sample and/or reagent may be added to chamber 335 via one or more inlets (not shown). Alternatively, reagent only enters channel 302 from chamber 335 and test sample enters channel 302 through a fluidic connection that is not shown in FIG. 3 or the test sample may be deposited manually or automatically into channel 302.

Referring back to FIG. 4, channel 402 may have the same structure, function, and content as reaction channel 807 described with respect to FIGS. 8 to 20 or variations thereof described herein, may connect to a pressure control device 2206a to move test sample and/or reagent through channel 402 in the manner described in operations 2000h to 2000K above, and may have an optical testing system 2203 positioned relative to channel 402 to perform tests on a mixture of test sample and reagent as described with respect to operations 2000l and 2000m above. In this example of FIG. 4, a first liquid such as test sample and/or a first reagent enters channel 402 from chamber 440. In this example of FIG. 4, a second liquid such as test sample and/or a second reagent that is the same or different than the first reagent enters channel 402 from chamber 440. For example, the test sample and/or reagent may be added to chambers 440, 4401 via one or more inlets (not shown) into each chamber. Alternatively, reagent only enters channel 402 from chambers 440 and 441 and test sample may enter channel 402 through a fluidic connection that is not shown in FIG. 4 or the test sample may be deposited manually or automatically into channel 402.

Referring back to FIG. 5, one or more, or each, of channels 550a, 551a, and 552a (FIG. 5C) may be replaced with a channel having the same structure, function, and content as reaction channel 807 described with respect to FIGS. 8 to 20 or variations thereof described herein. One or more such channels may connect to a respective pressure control device 2206a to move test sample and/or reagent through each channel in the manner described in operations 2000h to 2000K above, and may have an optical testing system 2203 positioned relative to the channel to perform tests on a mixture of test sample and reagent as described with respect to operations 2000l and 2000m above. In this example of FIG. 5, a liquid such as test sample and/or reagent enters one or more of channels 550a, 551a, and 552a from chamber 535. For example, the test sample and/or reagent may be added to chamber 535 via one or more inlets (not shown). Alternatively, reagent only enters one or more of channels 550a, 551a, and 552a from chamber 535 and test sample enters one or more of channels 550a, 551a, and 552a through one or more fluidic connections that are not shown in FIG. 5 or the test sample may be deposited manually or automatically into each channel.

Referring back to FIG. 6, channel 602 may have the same structure, function, and content as reaction channel 807 described with respect to FIGS. 8 to 20 or variations thereof described herein, may connect to a pressure control device 2206a to move test sample and/or reagent through channel 306 in the manner described in operations 2000h to 2000K above, and may have an optical testing system 2203 positioned relative to channel 602 to perform tests on a mixture of test sample and reagent as described with respect to operations 2000l and 2000m above. In this example of FIG. 6, a liquid such as test sample and/or reagent enters channel 602 from chamber 635. For example, the test sample and/or reagent may be added to chamber 635 via one or more inlets (not shown). Alternatively, reagent only enters channel 602 from chamber 635 and test sample may enter channel 602 through a fluidic connection that is not shown in FIG. 6 or the test sample may be deposited manually or automatically into channel 602.

Referring back to FIG. 7, channel 710 may have the same structure and function as reaction channel 807 described with respect to FIGS. 8 to 20 or variations thereof described herein, may connect to a pressure control device 2206a to move test sample and/or reagent through channel 702 in the manner described in operations 2000h to 2000K above, and may have an optical testing system 2203 positioned relative to channel 710 to perform tests on a mixture of test sample and reagent as described with respect to operations 2000l and 2000m above. In this example of FIG. 7, the test sample and/or optional liquid reagent may enter channel 710 from channel 709 via space 717. Alternatively, the test sample enters channel 710 through a fluidic connection that is not shown in FIG. 7 or the test sample may be deposited manually or automatically into channel 710.

Figure 21A:
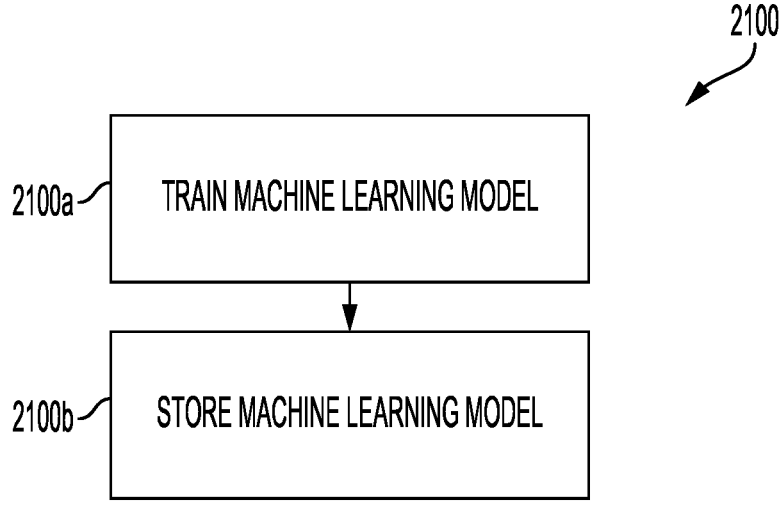
FIG. 21A is a flowchart containing example operations included in an example process for training a model used to detect an edge of a fluid flow.

FIG. 21A shows operations included in an example process 2100 for obtaining a machine learning (ML) model for use in detecting an edge of a fluid flow. Process 2100 may be performed by a computing system that is separate from the diagnostic test instrument and may be performed at a time prior to testing.

Process 2100 includes training (2100a) one or more machine learning models to recognize and/or to track edges in a fluid flow. The machine learning model or models may include a machine learning process that performs classification, regression, localization, detection, tracking, and/or segmentation in one or multiple images or over time. The machine learning model or models may include, but are not limited to convolutional neural networks, fully connected neural networks, convolutional network-based models, transformers, and transformer-based models. The machine learning model or models may include or more classifiers and/or regressors, each of which maybe used for specific object detection or tracking. The machine learning model or models may include object detection and tracking models that simultaneously track multiple objects.

The machine learning model can be part of an ensemble model with complementary algorithms that analyze image pixel intensities or color as input features and/or signals from additional device sensors, such as supervised learning techniques that include but are not limited to logistic regression, multiple regression, decision trees, random forests, support vector machine (SVM), gradient boosting, or neural networks.

Supervised machine learning techniques may build a model by examining examples and attempting to find a model that minimizes loss; this process is called empirical risk minimization. If the model's predictions are accurate, the loss approaches zero; otherwise, the loss is greater, which results in higher penalty during training. The goal of training the model is to find a set of weights and biases that have low loss, on average, across all examples to reach process robustness and generalization.

In some implementations, the machine learning model may be trained using data that include plasma flows, which are close to clear and, therefore, may be more difficult to detect than fluid flows having pronounced colors.

To enhance fluidic object detection and tracking robustness, the trained model can be integrated into an ensemble with complementary inference algorithms that analyze pixel properties of images at one or more specified fluidic channel locations, and/or with attention mechanisms that may include, but are not limited to upweighting pixels or features that are adjacent to a detected object in previous images and downweighing or removing pixels or features that are distant from the detected object in previous images. The amounts that constitute an adjacent or distant pixel or feature may be preprogrammed into the model The upweighting and downweighing may enable the detection process to focus on a region that borders the detected object.

An example inference algorithm applies logical rules to a knowledge base to evaluate and analyze new information. In the training phase, intelligence is developed by recording, storing, and labeling information. The machine learning process may be fed with images of edge flow. In the inference phase, the process uses the intelligence gathered and stored in phase one to understand new data. In this phase, the process uses inference to identify and categorize new images as edges.

The inference algorithms may analyze pixel properties in one or multiple locations of an image of the cartridge and can incorporate and analyze inputs from one or more sensors such as those in the optical testing system 2203. These models can be either threshold-based classification algorithms, or machine learning models that infer based on multiple features.

Process 2100 stores (2100b) one or more such machine learning models and/or inference algorithms in memory 2210 (FIG. 24) of the diagnostic test instrument that uses the cartridge.

Figure 21B:
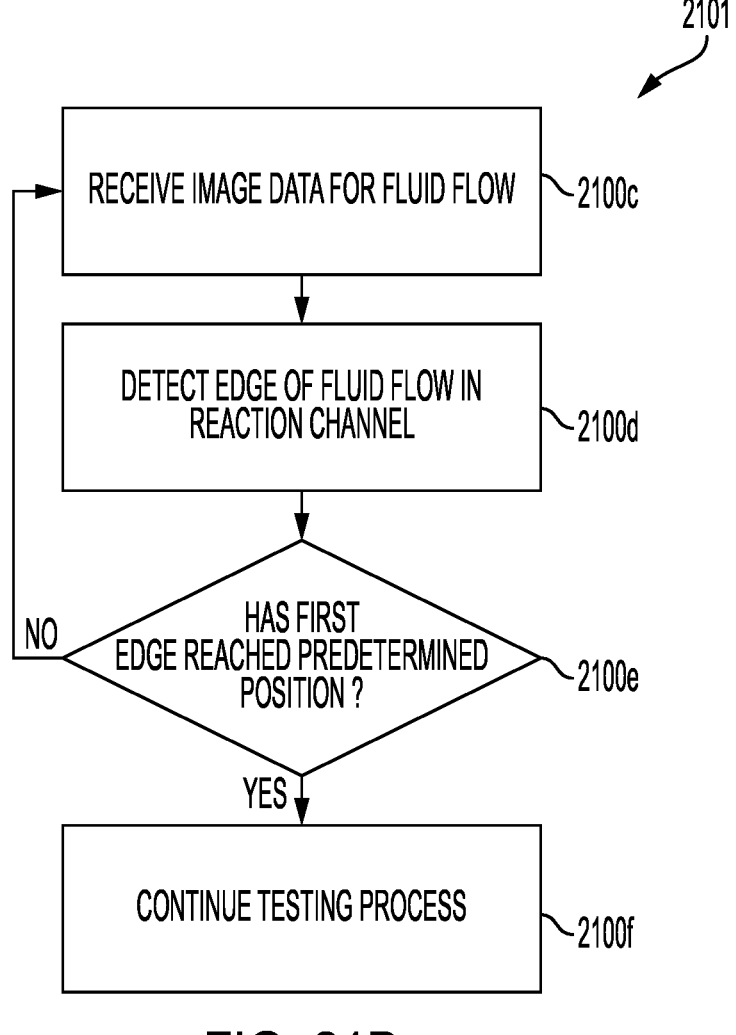
FIG. 21B is a flowchart containing example operations included in an example process for detecting an edge of a fluid flow.

FIG. 21B shows operations included in an example process 2100 for detecting edges of fluid flows in a channel, such as reaction channel 807. Process 2101 may be performed by processing device(s) 2212 using the stored machine learning models and/or inference algorithms and by executing some of the instructions 2211 stored in memory 2210 of control system 2201. Each of the foregoing machine learning processes and inference algorithms can be used separately, in parallel, or as ensemble to improve detection robustness and redundancy.

Process 2101 receives (2100c) image data representing the fluid flow. For example, a camera, which may be included in the test instrument into which the cartridge inserts, is positioned above reaction channel 807 may capture one or more images of reaction channel 807. In some implementations, the camera may capture 10 to 20 images per second while fluid is flowing in the channel or while the fluid is static in the channel. In implementations where one image may be captured and used for detection as described below, additional other images may be used, such as images captured subsequent to the one image, to improve upon the detection.

These images constitute the received image data that is input into the stored model. Process 2101 uses the model separately or in ensemble with complementary inference algorithms to detect (2100d) a leading edge of the fluid flow (both liquid reagent and test sample in this example) and a location within reaction channel 807 of that leading edge. For example, referring to FIG. 16, the model may analyze the image data to detect the leading edge 880 of the fluid flow within reaction channel 807. The leading edge may be determined by identifying differences in composition of the image data. For example, fluid in the channel may have a different color or shade than regions of the channel that do not include fluid. Regions of the channel may be imaged and the resulting imaged data may be used to identify regions having the different colors or shades. For example, the imaged data may be compared to color or shading thresholds, which may be preset based on experimental data. Abutting regions that exceed their respective thresholds may be identified as an edge in the fluid. The location of that edge may be detected in the reaction channel.

The location of the edge detected in operation 2100 in reaction channel is compared to a predefined location in the reaction channel to determine (2100e) if the fluid flow has reached the predefined location. The predefined location may be programmed into the control system and may be based on the volume of fluid required for a particular test to be performed in the reaction channel. For example, the predefined location may be set so that the reaction channel fills with sufficient liquid to perform a specific test. After it is determined that the fluid flow has reached the predefined location, process 2000 may continue (2100e) the testing process.

Process 2100 may also be repeated to detect a trailing edge of the fluid flow, e.g., simultaneously with the detection of the leading edge, within the reaction channel after all fluid 866 needed (FIG. 16) has entered the reaction channel. In some implementations, trailing edge detection may be a secondary detection used for confirmation of a leading fluidic edge location and workflow progress.

Figure 22:
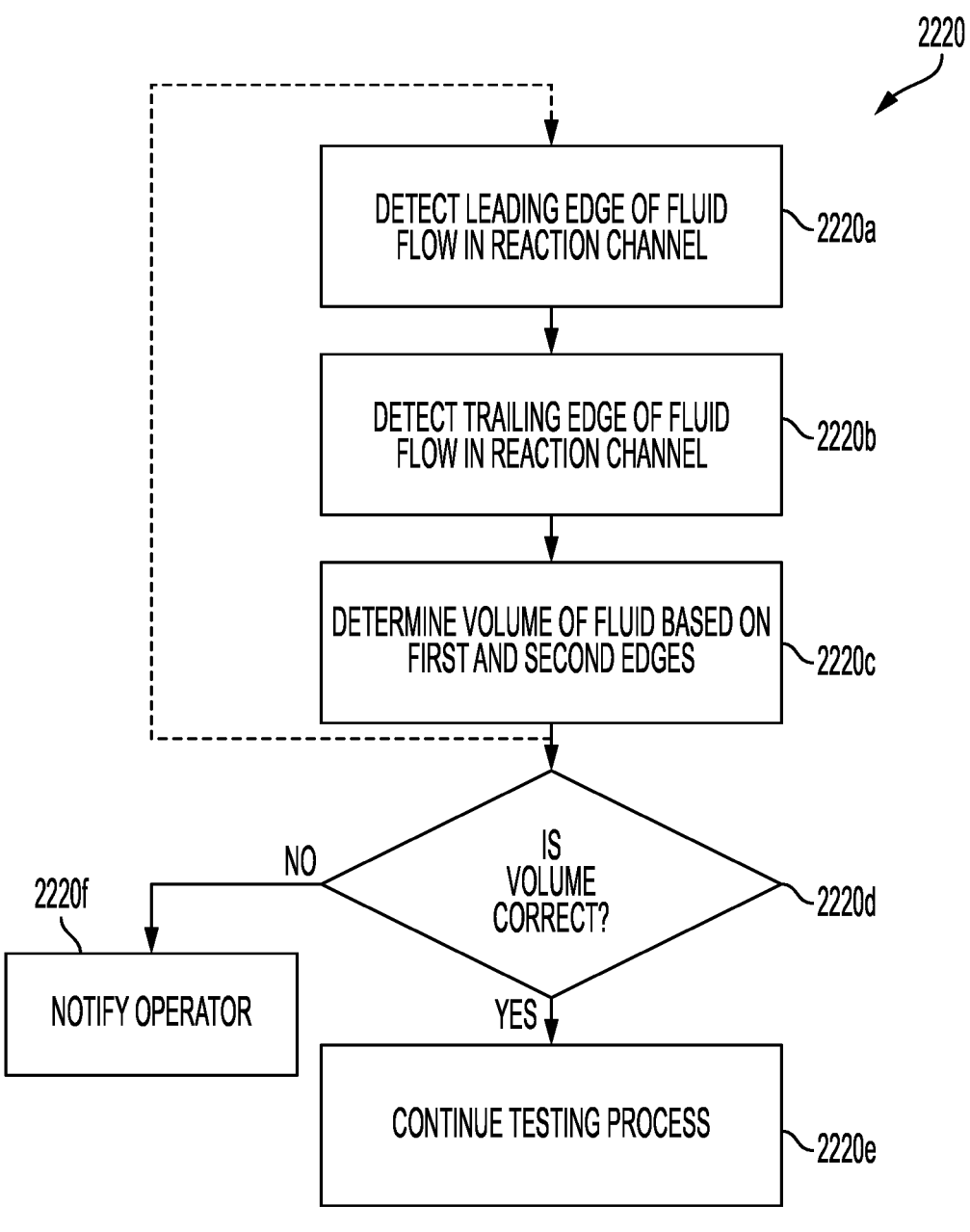
FIG. 22 is a flowchart containing example operations included in an example process for determining the volume of liquid in a cartridge channel.

Referring to FIG. 22, process 2220 may be used to determine that a correct volume of liquid for a current assay is in reaction channel 807. Process 2220 may be performed by processing device(s) 2212 executing some of the instructions 2211 stored in memory 2210 of control system 2201.

Process 2220 includes detecting (2220a) the leading edge of a fluid flow along the direction of the fluid flow in reaction channel 807 using process 2100. Process 2220 includes detecting (2220b) the trailing edge of the fluid flow in reaction channel 807 using process 2100. The detections 2220a, 2220b can be performed simultaneously at the same frequency or at a different frequency, e.g., at 5 to 20 or more images per second or greater, or using occasional or on-demand inference using the operations described in connection with FIG. 21B. The locations of the leading edge and the trailing edge may be used to determine the volume of liquid (e.g., reagent and test sample) in the reaction channel. That is, the geometry of the reaction channel is stored in memory. Knowing that geometry and the locations of the leading edge of the liquid and the trailing edge of the liquid, the control system may determine the volume of liquid that is in the reaction channel.

The liquid volume may be determined a predefined number of times. For example, the camera that captures the image data the leading and trailing edges a number of times per second—for example, 5 to 20 or more images per second, or using occasional or on-demand inference. For each such image, process 2220 determines the volume and the resulting volumes may be averaged (2220c). The averaging may be weighted averaging that takes into account machine learning process certainty, and may be combined with removal of values that are outside of a predetermined range of values. This method may reduce the chances of error in the volume estimation since it deemphasizes anomalous measurements. The number of volumes that are to be averaged may be programmed into the control system based on known data correlating error reductions to number of volumes averaged.

Thereafter, the averaged volume of liquid is compared to a predefined volume of liquid needed for the current assay. If the volume is correct (2220d), that is, the averaged volume is equal to or within an acceptable variance of the predefined volume (e.g., 1%, 2%, or 3%), then the testing process continues (2220e). If the volume is not correct (2220d), process notifies (2220f) an operator that an incorrect amount of liquid has been metered. This notification may be visual, e.g., by display on a user interface of the diagnostic test instrument, or audio, e.g., by sounding an alarm. In some implementations, the testing process may be stopped automatically in the event that the volume is incorrect unless the operator intervenes to restart the testing process.

By detecting the volume based on edges of fluid flows using process 2220, test liquids may be metered without use of valves or sensors that are internal to the channels of the cartridge. This may simplify the construction of the cartridge.

In some implementations of operations 2220a to 2220c, averages may not be used. For example, the edges may be tracked over time without use of averages. In some implementations of operations 2220a and 2220b running averages alone may not be used. For example, edge measurements falling outside of one standard deviation, two standard deviations, and so forth of a group of edge measurements may be disregarded in determining an average. Averaging of measured distances among edges can be combined with additional techniques described herein to increase estimate precision over time, such as weighted averaging using model certainties and attention mechanisms that reduce the effect of image features that are greater than a predefined distance from the detected object location in prior images.

In some cases, anomalies in the liquid in reaction channel 807 may adversely affect testing. An example of such an anomaly is an air bubble within the sample or sample-reagent mixture; however, foreign particles, debris, or unmixed dry reagent at region 871 in the reaction channel may also affect testing. Process 2301 may be used to detect such anomalies. Process 2301 may be executed at any point in the testing process 2000 (FIG. 20) after liquid has entered the reaction channel and the result of process 2301 may cause testing to cease. Process 2301 may be performed by processing device(s) 2212 executing some of the instructions 2211 stored in memory 2210 of control system 2201 (FIG. 24).

Figure 23A:
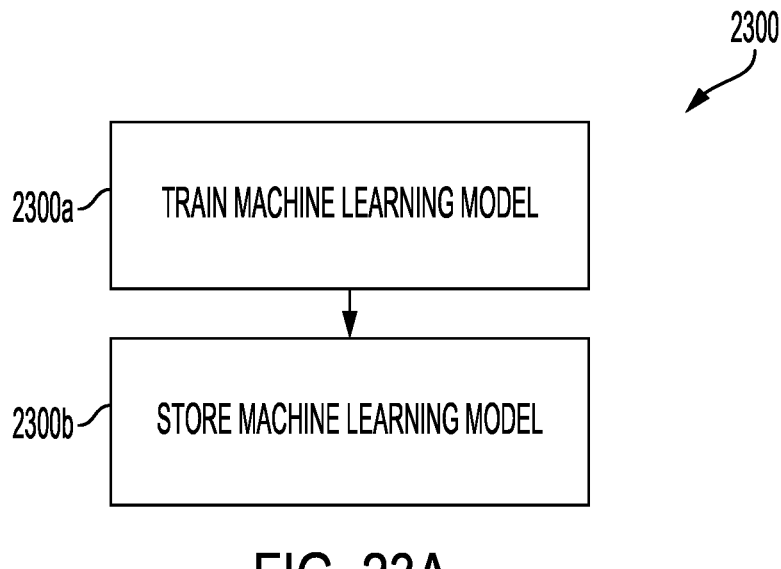
FIG. 23A is a flowchart containing example operations included in an example process for training a model used to detect an anomaly in a fluid flow.

FIG. 23A shows operations included in an example process 2300 for obtaining a machine learning model for use in process 2301 for detecting an anomaly, including transparent anomalies, in a fluid flow. Process 2300 may be performed by a computing system that is separate from the diagnostic test instrument and may be performed at a time prior to testing. Process 2300 includes training (2300a) a machine learning model to recognize anomalies in a fluid flow. Any machine learning process, including those described herein, may be used. In particular non-limiting examples, anomaly detection is performed using a Efficient-Net or MobileNet convolutional neural network algorithm having all of its layers, or its top layers expanded with additional layers, or customized, and trained to detect anomalies and fluid edges. In some implementations, sections of the convolutional neural network algorithm, instead of the whole algorithm, can be trained to perform the detection.

Similar, to edge detection, anomaly detection and tracking may be performed using custom fully-connected neural networks or transformer-based object detection models. Similar to edge detection, to enhance robustness of anomaly object detection and tracking, the trained model may be integrated in an ensemble with complementary inference algorithms that analyze pixel properties of an image at one or more specified fluidic channel locations, and/or with attention mechanisms, that can be, but are not limited to, upweighting pixels or features that are adjacent to the object detection in one or more previous image and downweighing or removing the pixels or features that are distant from the object in one or more previous image.

The inference algorithms may analyze pixel properties in one or multiple locations of the frame or cartridge and can incorporate and analyze inputs from one or more sensors such as those in the optical testing system 2203. These inference algorithms can include, for example, threshold-based classification algorithms or machine learning models that make inferences based on multiple features.

The machine learning models and/or inference algorithms, such as those described above, may be trained to detect anomalies and/or edges of fluid flow in fluidic platforms other than cartridges, such as tubes. Cross-platform (e.g., channels and tubes) training may improve detection precision for each of the machine learning models and/or inference algorithms.

In the examples above, a machine learning model and/or inference algorithm can be deployed on, and executed on, a tensor processing unit (TPU) or alternatively a graphics processing unit (GPU) 2240, which may be part of control system 2201 of FIG. 24. These devices are battery efficient upon typical quantization of machine learning model using TFLite or TensorRT, which are libraries for or deploying machine learning models to devices. Reductions in layers in a machine learning model above may improve battery efficiency of these devices even further.

FIG. 23B shows operations included in an example process 2301 for detecting an anomaly in a fluid flow such as, but not limited to, a fluid flow in a channel such as reaction channel 807. In this example, the anomalies may include bubbles or solid particles such as debris in the channel that reflect or refract light, and that are at locations other than where dry reagent (if any) is known to be deposited in the channel. Process 2301 may also detect leading and trailing edges of the fluid flow.

In this example, process 2301 may be performed by TPU or GPU 2240 and processing device(s) 2212 executing some of the instructions 2211 stored in memory 2210 of control system 2201.

Process 2301 selects (2300*a*) an area of interest of a cartridge such as a portion of reaction channel 807. The area of interest may include one or more, or all, of the channels, and may include all or part of each selected channel.

Process 2301 controls (2300*b*) a camera, which may be part of the test instrument into which the cartridge inserts, positioned above the cartridge. The camera may be configured to capture images one or more, or all, of the channels. The captured images may represent content of a channel based on the intensity of pixels in a captured image. The camera may be movable to point to all or part of the cartridge and may contain a zoom lens (e.g., 2× zoom, 5× zoom, 10× zoom) to capture zoomed-in images.

Process 2301 directs the camera to the region of interest and controls the camera to capture one or more images of the region of interest. In some implementations, multiple images may be captured. For example, 5 to 10 or more images of the region of interest may be captured. The images may be captured during flow of fluid through a channel in the region of interest or when the fluid is static in the channel.

Process 2301 receives (2300*c*) image data representing the region of interest from the camera. Process 2301 preprocesses (2300*d*) the image data to enhance the contrast between the background of the image and objects in the image, which may enhance the depiction of potential anomalies in the region.

Process 2301 uses the trained machine learning model and, possibly, an inference algorithm, to detect (2300*e*) one or more anomalies and/or edges of fluid flow in the region of interest in any channel based on the image data. Multiple machine learning processes and inference algorithms can be used separately, in parallel, or as ensemble to improve detection robustness and redundancy.

The identified location of the anomalies and/or edges may be fed back to the machine learning process(es) and/or inference algorithm(s) that were used. The machine learning process(es) and/or inference algorithm(s) may use this information to direct the camera along a channel to track the anomaly and/or edges as they travel through the channel. By using the initial location of the anomaly and/or edges, the camera can focus on a more narrow region of the channel when tracking the travel of the anomaly and/or edges. In some implementations, the machine learning process(es) and/or inference algorithm(s) may know the rate of flow of fluid through the channel and take this information into account when directing the camera to perform the tracking. Directing the camera can be done by, but is not limited to, cropping a location of interest or by attention mechanisms, which can be, but are not limited to upweighting pixels or features that are adjacent to the detected object in previous images and downweighing or removing the pixels or features that are distant from the detected object in previous images.

In the case of detected edges of fluid flow, the detected edges may be used to determine the volume of fluid in the channel in accordance with process 2220 described above. In the case of anomalies, the machine learning model may continue to track the anomalies as they move through the channel. In some cases, anomalies, such as bubbles may dissipate, in which case no action need be taken with respect to those anomalies.

The detection process 2300*e* may continue to track the anomalies and fluid edges up to an including in region 871, where optical detection is performed.

In some implementations, process 2301 may be performed using data captured by optical detection system 2203 (FIG. 19) rather than image data captured by the camera. In some implementations, process 2301 may be performed using both data captured by optical detection system 2203 (FIG. 19) and image data captured by the camera.

Other techniques may also be used to detect (2300*e*) anomalies at region 871. For example, each assay performed using cartridge 800 may be associated with an expected diagnostic curve. The expected diagnostic curves for each assay may be stored in memory 2210 of control system 2201 (FIG. 24). The optical testing system 2203 (FIG. 19) at region 871 of cartridge 800 may generate a diagnostic curve for the assay based on the optical detection performed by the optical testing system. Process 2300 may retrieve the expected diagnostic curve for a subject assay from memory 2210 and attempt to fit the expected diagnostic curve to the generated diagnostic curve. Following the curve fitting, the results are analyzed to identify where there is a deviation between the expected diagnostic curve and the generated diagnostic curve. Those locations may be identified as locations of anomalies in the channel content. For example, the generated diagnostic curve may contain noise, which is represented by spikes in the curve, that are not present in the expected diagnostic curve.

Process 2301 may also detect anomalies in a region of interest based on analyzing derivative peaks in the generated diagnostic curve. For example, the beginning of the expected diagnostic curve for an assay may be flat. The generated diagnostic curve for the assay; however, may contain noise, which represent anomalies in the channel.

Process 2301 may generate derivatives of curves containing this noise, such as second and/or third derivatives of curve sections containing the noise. Locations of the second and/or third derivative peaks correspond to locations where the diagnostic curve approaches baseline, which is the point where the anomalies are no longer present. In some implementations, locations of the second and/or third derivative peaks having widths above or below a predefined threshold correspond to locations where the diagnostic curve approaches baseline.

In some implementations, all three of the above techniques, namely machine learning, curve fitting, and peak detection, may be used at region 871 to identify anomalies. In some implementations, the three techniques may be complementary in that the three techniques may be used to verify each others' results. In some implementations, if one or more of these techniques, or two or more of these techniques, or all of these techniques detect an anomaly at region 871, the control system provides an output (2300*f*) to an operator, who may then instruct that the assay be rerun or instruct that the assay continue. The output may be presented on a graphics display device, which may be part of a diagnostic test instrument, such as those described herein. The output may include an identity of the anomaly and the location of the anomaly in the channel. For example, a depiction of the channel may be provided, along with the location and identity of the anomaly. A user may then make a decision to proceed with the assay or to rerun the assay based on the detected anomaly. In some implementations, if one or more of these techniques, two or more of these techniques, or all of these techniques detect an anomaly at region 871, the control system may automatically rerun the assay without requiring user input.

The inference algorithms described previously may be used analyze pixel properties in one or multiple locations of an image of cartridge in order to perform the anomaly detection in operation 2300*e*. Examples of inference algorithms that may be used are described above and include, but are not limited to, threshold-based classification algorithms and machine learning models that make inferences based on multiple features.

Each of the techniques for detecting an anomaly described herein may be used alone or in combination with one or more of the other techniques.

In some implementations, it may be possible to recover from an anomaly or fluid edge detected at region 871. Generally, if an anomaly or fluid edge is detected at the location of detection by system 2203 at region 871, the fluid in channel 807 may be moved so that the anomaly or fluid edge is not at that location. For example, the control system 2201 may be programmed to control pressure control device 2206*a* introduce positive or negative pressure into reaction channel 807 to move the anomaly or fluid edge fluid edge away from location 871. The amount of movement may range from individual millimeters to individual centimeters depending on the sensitivity of optical testing system 2203, the area covered by that system, the size of the anomaly if present, and the amount of fluid in the channel.

In some implementations, it may be possible to recover from an anomaly at region 871 by processing the generated diagnostic curve obtained using measurements from optical testing system 2203. For example, in the above curve fitting example, the expected curve may be fit over the generated curve extrapolated to cover locations on the curve where the expected diagnostic curve and the generated diagnostic curve deviate (that is, to eliminate the noise representing the anomaly).

In some implementations, the location where the second and/or third derivative peaks exist adjacent to the expected starting point on the generated curve may be identified. All locations that precede those locations contain noise and, thus, an anomaly. The portions of the diagnostic curve that precede those locations may thus be disregarded and the start of the diagnostic curve may be designated as the location where the second and/or third derivative peaks reach zero or other predefined constant.

In some implementations, a denoising technique such as filtering or mean average smoothing may be used to eliminate noise caused by artifacts in the diagnostic curve. In an example, mean average smoothing smooths portions of a curve over a moving average in order to eliminate spikes in the curve.

In some implementations, the diagnostic waveform or sections of the diagnostic waveform can be analyzed by an artificial intelligence (AI) or machine learning process during and/or after data acquisition completion. The AI or machine learning process can provide either qualitative or quantitative indications, including but not limited to, the type of waveform and whether the waveform contains an anomaly.

The processes described herein may be implemented using any computing systems or any other appropriate computing device. Systems and processes can be implemented, at least in part, using one or more computer program products, e.g., one or more computer program tangibly embodied in one or more information carriers, such as one or more non-transitory machine-readable media, for execution by, or to control the operation of, one or more data processing apparatus, e.g., a programmable processor, a computer, multiple computers, and/or programmable logic components.

A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a network.

Actions associated with implementing all or part of the processes can be performed by one or more programmable processors executing one or more computer programs to perform the functions described herein. All or part of the processes can be implemented using special purpose logic circuitry, e.g., an FPGA (field programmable gate array) and/or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only storage area or a random-access storage area or both. Elements of a computer (including a server) include one or more processors for executing instructions and one or more storage area devices for storing instructions and data. Generally, a computer will also include, or be operatively coupled to receive data from, or transfer data to, or both, one or more machine-readable storage media, such as mass storage devices for storing data, e.g., magnetic, magneto-optical disks, or optical disks. Machine-readable storage media suitable for embodying computer program instructions and data include all forms of non-volatile storage area, including by way of example, semiconductor storage area devices, e.g., EPROM, EEPROM, and flash storage area devices; magnetic disks, e.g., internal hard disks or removable disks; magneto-optical disks; and CD-ROM and DVD-ROM disks.

Elements of different implementations described herein may be combined to form other implementations not specifically set forth above. Elements may be left out of the structures described herein without adversely affecting their operation. Operations in flowcharts may be performed, where appropriate, in different orders than those shown. Various separate elements may be combined into one or more individual elements to perform the functions described herein.

What is claimed is:

1. A diagnostic test instrument comprising:
   a base comprising a first channel configured to receive a fluid, the fluid including a test sample to be tested on the diagnostic test instrument, the first channel comprising a first section to receive the test sample and a second section on which testing is performed; and
   a structure comprising a second channel, the structure being configured to move relative to the base between a first position and a second position;
   wherein, in the first position, the first channel and the second channel are aligned to create a fluidic connection between the first section of the first channel, the second channel, and the second section of the first channel and, in the second position, the first channel and the second channel are unaligned to block a fluidic connection between the first channel and the second channel.

2. The diagnostic test instrument of claim 1, wherein the test sample comprises a first part of the fluid;
   wherein the structure further comprises a first container comprising a first chamber to hold a second part of the fluid, and the structure further comprises a fluidic duct fluidically connected to the first chamber.

3. The diagnostic test instrument of claim 2, wherein the second part of the fluid comprises a reagent, a reaction buffer, or both the reagent and the reaction buffer.

4. The diagnostic test instrument of claim 2, wherein the diagnostic test instrument further comprises:
   a second container comprising a second chamber to hold the test sample;
   wherein, in the first position, the first section of the first channel is between the structure and the second container;
   wherein when the structure is in the first position, the second container, the first section of the first channel, the second channel, the fluidic duct, and the second section of the first channel are fluidically connected; and
   wherein the second container is stationary.

5. The diagnostic test instrument of claim 2, wherein the base comprises a third channel
   wherein, in the second position, the structure creates a fluidic connection between the third channel and the fluidic duct.

6. The diagnostic test instrument of claim 1, wherein the structure further comprises a seal disposed between a part of the structure and the base, the seal being liquid-tight, and the seal comprising the second channel.

7. The diagnostic test instrument of claim 1, further comprising:
   one or more spacers or one or more springs to apply force to the structure to push part of the structure relative to the base.

8. The diagnostic test instrument of claim 1, further comprising:
   at least one spring to apply force to the structure to push part of the structure relative to the base.

9. The diagnostic test instrument of claim 1, wherein the structure is further configured to receive force and to slide between the first position and the second position in response to the force.

10. A diagnostic test instrument comprising:
    a base comprising a first channel configured to receive a fluid, the fluid including a test sample to be tested on the diagnostic test instrument;
    a structure comprising a second channel, the structure being configured to move relative to the base between a first position and a second position;
    wherein, in the first position, the first channel and the second channel are aligned to create a fluidic connection between the first channel and the second channel and, in the second position, the first channel and the second channel are unaligned to block a fluidic connection between the first channel and the second channel; and
    a reservoir for receiving the test sample, at least some of the test sample comprising a first part of the fluid;
    wherein the first channel comprises a first section and a second section, the first section being fluidically connected to the reservoir; and
    wherein, in the first position, the second channel is between the first section and the second section of the first channel to create the fluidic connection to enable the second section of the first channel to receive the first part of the fluid from the first section of the first channel.

11. The diagnostic test instrument of claim 10, wherein the structure further comprises a container comprising a chamber to hold at least a second part of the fluid, the chamber comprising an outlet fluidically connected to the chamber; and
    wherein, in the first position, the outlet of the chamber is fluidically connected to the second section of the first channel to enable the second section of the first channel to receive the at least second part of the fluid from the chamber.

12. The diagnostic test instrument of claim 11, wherein the base comprises a third channel; and wherein, in the second position, the outlet is fluidically connected to the third channel.

13. The diagnostic test instrument of claim 12, wherein part of the second section of the first channel is serpentine in shape, the serpentine shape comprising expanding and constricting geometries; and
    wherein the diagnostic test instrument further comprises a first port to connect the second section of the first channel to a first pressure control device.

14. The diagnostic test instrument of claim 1, wherein at least part of the first channel is serpentine in shape, the serpentine shape comprising expanding and constricting geometries.

15. The diagnostic test instrument of claim 1, further comprising a cartridge comprising the base and the structure.

16. The diagnostic test instrument of claim 1, further comprising a cartridge comprising at least the base.

17. A method of using the diagnostic test instrument of claim 1, the method comprising:
    adding, with the structure in the first position, the test sample into the first channel;

adding reagent to the first channel;

identifying an amount of test sample and reagent in the first channel;

producing a mixture comprising the test sample and the reagent by mixing the test sample and the reagent in the first channel;

determining whether the mixture has an anomaly or not;

if the mixture is determined to have the anomaly, outputting an alert; and if the mixture is determined not to have the anomaly, proceeding with a testing.

18. The method of claim 17, wherein the identifying the amount of test sample and reagent in the channel comprises:

detecting a first edge of a fluid flowing in the first channel, the fluid flowing in the first channel comprising the amount of test sample and reagent in the first channel;

detecting a second edge of the fluid flowing in the first channel; and determining a fluid volume in the first channel based on the first edge and the second edge.

19. The method of claim 18, comprising detecting values for the first edge in multiple images of the first channel and values for the second edge in the multiple images; and wherein the determining the fluid volume in the first channel is based on the detected first edge and the detected second edge detected in the multiple images.

\*    \*    \*    \*    \*